United States Patent
Ohara et al.

(10) Patent No.: US 9,371,884 B2
(45) Date of Patent: Jun. 21, 2016

(54) ELECTROMAGNETIC VIBRATION SUPPRESSION DEVICE AND ELECTROMAGNETIC VIBRATION SUPPRESSION PROGRAM

(75) Inventors: Hisanori Ohara, Tokyo (JP); Kazuhisa Matsuda, Tokyo (JP)

(73) Assignee: SINFONIA TECHNOLOGY CO., LTD., Tokyo (JP)

(*) Notice: Subject to any disclaimer, the term of this patent is extended or adjusted under 35 U.S.C. 154(b) by 18 days.

(21) Appl. No.: 14/009,010

(22) PCT Filed: Mar. 27, 2012

(86) PCT No.: PCT/JP2012/057850
§ 371 (c)(1),
(2), (4) Date: Sep. 30, 2013

(87) PCT Pub. No.: WO2012/133362
PCT Pub. Date: Oct. 4, 2012

(65) Prior Publication Data
US 2014/0027216 A1    Jan. 30, 2014

(30) Foreign Application Priority Data

Mar. 30, 2011   (JP) .................................. 2011-075937
Mar. 30, 2011   (JP) .................................. 2011-075938

(51) Int. Cl.
*F16F 15/03*   (2006.01)
*G05D 19/02*   (2006.01)
(Continued)

(52) U.S. Cl.
CPC ................. *F16F 15/03* (2013.01); *C23C 2/003* (2013.01); *C23C 2/40* (2013.01); *G05D 19/02* (2013.01)

(58) Field of Classification Search
CPC ........... C23C 2/003; C23C 2/40; F16D 15/03; G05D 19/02
USPC ................ 188/267; 414/222.02, 225.01, 806; 226/102, 196.1; 72/17.3
See application file for complete search history.

(56) References Cited

U.S. PATENT DOCUMENTS 6,471,153 B1 * 10/2002 Kimura ................. B21B 37/007
                                                        226/15
9,080,232 B2    7/2015 Ohara et al.
(Continued)

FOREIGN PATENT DOCUMENTS

JP    2001-162313 A    6/2001
JP    2009-179834 A    8/2009
(Continued)

OTHER PUBLICATIONS

International Search Report of PCT/JP2012/057850, mailing date of Jun. 19, 2012.
(Continued)

*Primary Examiner* — Robert A Siconolfi
*Assistant Examiner* — San Aung
(74) *Attorney, Agent, or Firm* — Westerman, Hattori, Daniels & Adrian, LLP

(57) ABSTRACT

The electromagnetic vibration suppression device includes a plurality of electromagnet pairs arranged in the width direction of a steel plate and which suppresses vibration of the steel plate running between electromagnets in each electromagnet pair using a control unit. The pseudo displacement calculation means calculates a pseudo displacement amount for the steel plate on the basis of the switching between ON and OFF of a sensor attached to the electromagnet pairs. The pseudo edge position calculation means calculates a pseudo edge position for the steel plate on the basis of the pseudo displacement amount. The current amount control means individually controls the amount of current that flows to the electromagnets on the basis of the pseudo edge position.

9 Claims, 12 Drawing Sheets

(51) Int. Cl.
*C23C 2/00* (2006.01)
*C23C 2/40* (2006.01)

(56) References Cited

U.S. PATENT DOCUMENTS

| | | | | |
|---|---|---|---|---|
| 2003/0077397 | A1* | 4/2003 | Kabeya | C23C 2/003 427/431 |
| 2009/0175708 | A1* | 7/2009 | Lofgren | C23C 2/40 414/222.02 |
| 2009/0191360 | A1* | 7/2009 | Teramoto | C23C 2/003 427/595 |
| 2010/0161104 | A1* | 6/2010 | Lofgren | B21B 37/007 700/109 |
| 2010/0209591 | A1* | 8/2010 | Eriksson | C23C 2/003 427/8 |
| 2011/0217481 | A1* | 9/2011 | Ohara | C23C 2/003 427/547 |

FOREIGN PATENT DOCUMENTS

| | | |
|---|---|---|
| JP | 2011-195905 A | 10/2011 |
| JP | 2011-214146 A | 10/2011 |

OTHER PUBLICATIONS

Final Office Action dated Oct. 3, 2014, issued in U.S. Appl. No. 13/636,019 by Ohara et al. (issued as U.S. Pat. No. 9,080,232) (15 pages).

Notice of Allowance dated Mar. 12, 2015, issued in U.S. Appl. No. 13/636,019 by Ohara et al. (issued as U.S. Pat. No. 9,080,232) (9 pages).

* cited by examiner

ELECTROMAGNETIC VIBRATION SUPPRESSION DEVICE AND ELECTROMAGNETIC VIBRATION SUPPRESSION PROGRAM

TECHNICAL FIELD

The present invention relates to an electromagnetic vibration suppression device capable of preventing and suppressing a steel plate being conveyed from vibrating with an electric current output from an electromagnet and an electromagnetic vibration suppression program applicable to the electromagnetic vibration suppression device.

BACKGROUND ART

Conventionally, for example, in a continuous galvanized line, excess molten zinc is blown off by jetting pressurized air or pressurized gas from an air knife unit (e.g., configured using air nozzles) against a steel plate, which passes a molten zinc tank and runs while being pulled up, to obtain a desired plating thickness. In such a case, if the steel plate vibrates in a direction in which the steel plate approaches and separates from the air knife unit, the distances between the nozzles and the steel plate fluctuate. As a result, in some cases, pressure (a jet force) received by the steel plate fluctuates and the thickness of plating becomes uneven, causing deterioration in quality.

Therefore, there has been conceived an electromagnetic vibration suppression device which controls electric currents fed to electromagnets arranged to be opposed to each other in positions across a running steel plate to thereby control an attractive force of the electromagnets and reduce the vibration of the running steel plate (e.g., Patent Literature 1). The electromagnetic vibration suppression device of this type includes a plurality of sets of displacement sensors arranged in the width direction of the steel plate, and is configured to detect a relative position (distance) to the steel plate, provided to be associated with the respective electromagnets and control electric currents fed to the respective electromagnets on the basis of the relative position (distance) to the steel plate detected by the respective displacement sensors.

Incidentally, the steel plate running between the opposed electromagnets sometimes meanders in the width direction. Since an edge position (an end edge) of the steel plate changes before and after the occurrence of the meandering, there is a demand for a control specification for adjusting output currents of the respective electromagnets according to the change in the edge position.

Therefore, Patent Literature 1 discloses an aspect includes a plurality of sensors (edge position detection sensors), which are different from the displacement sensors, arranged such that an edge position of a running steel plate can be always detected at a predetermined pitch in the width direction of the steel plate, in positions where the sensors could be opposed to the edge position of the steel plate, and is configured to determine, with the respective edge position detection sensors, whether the steel plate is present, and, when the presence of the steel plate is detected, drive electromagnets associated with the edge position detection sensors and, on the other hand, when the presence of the steel plate is not detected, stop driving of the electromagnets associated with the edge position detection sensors.

CITATION LIST

Patent Literature
    Patent Literature 1: Japanese Patent Laid-Open No. 2009-179834

SUMMARY OF INVENTION

Technical Problem

However, in the aspect explained above, the configuration for arranging, in addition to the displacement sensors, the plurality of different sensors for the purpose of detecting the edge position is essential. Moreover, an arrangement region of the edge position detection sensors has to be set taking into account a maximum swing width (meandering amount) of the steel plate in the case of meandering according to a type of the steel plate (plate width, etc.). Therefore, a problem is anticipated in that, if the arrangement setting is inappropriate, vibration suppression for the steel plate cannot be stably performed and appropriate control is difficult. When the number or the arrangement density of the edge position detection sensors is increased in order to obtain a more accurate detection result, there is a problem in that further complication of the structure and a further increase in costs are caused. Note that an aspect for changing attachment positions of the edge position detection sensors according to a type of the steel plate is also conceivable. However, replacement work is required every time the type of the steel plate changes and work efficiency is deteriorated.

Therefore, the applicant has developed, as an electromagnetic vibration suppression device capable of appropriately suppressing the vibration of a running steel plate without adopting a special sensor for edge position detection as an essential structure, an electromagnetic vibration suppression device including pseudo edge position calculation means for calculating an edge position of the steel plate on the basis of an input width dimension of the steel plate and a displacement amount in the width direction of the steel plate input on a real time basis or at every predetermined time and current amount control means for individually controlling an amount of electric currents fed to electromagnets on the basis of the edge position of the steel plate calculated by the pseudo edge position calculation means. The applicant has already filed an application for patent of the electromagnetic vibration suppression device (Japanese Patent Laid-Open No. 2011-214146).

However, the aspect explained above is based on the premise that the displacement amount (a meandering amount) in the width direction of the steel plate is input from an apparatus (e.g., a host computer) different from the electromagnetic vibration suppression device or a part (e.g., a meandering amount detection device) of the electromagnetic vibration suppression device. Therefore, under a usage condition in which the precondition is not satisfied, it was considered desirable that the electromagnetic vibration suppression device itself determines the displacement amount of the steel plate and performs vibration suppression control.

An attempt for conveying a steel plate in a state in which the steel plate is curved in the width direction to thereby increase the rigidity of the steel plate itself being conveyed is also performed. In this case, a curved shape of the steel plate with which appropriate vibration suppression control by the electromagnetic vibration suppression device can be displayed is set in advance. The electromagnetic vibration suppression device controls output currents of electromagnets configuring respective electromagnet pairs such that the steel plate is curved in an expected curved shape.

Incidentally, the steel plate running between the opposed electromagnets sometimes meanders in the width direction. When the output currents of the respective electromagnets are controlled to keep an expected setting value even if the meandering occurs, it is likely that a shape in the thickness direction of the steel plate is deformed into a shape (e.g., an asymmetrical distorted shape) different from the expected curved shape by an electromagnetic attraction force of the electromagnets output at an expected setting value in a position where the steel plate meanders. Therefore, a problem is anticipated in that stable vibration suppression action cannot be displayed for the steel plate running while keeping the shape different from the expected curved shape and appropriate control is difficult.

Therefore, the applicant has developed the electromagnetic vibration suppression device described in the publication of patent application as an electromagnetic vibration suppression device capable of appropriately suppressing the vibration of the steel plate by enabling conveyance with an expected curved shape maintained even when a steel plate running in a curved state in the thickness direction meanders in the width direction.

However, as explained above, the aspect of the publication of patent application is based on the premise that the displacement amount (the meandering amount) in the width direction of the steel plate is input from an apparatus (e.g., a host computer) different from the electromagnetic vibration suppression device or a part (e.g., a meandering amount detection device) of the electromagnetic vibration suppression device. Therefore, under a usage condition in which the precondition is not satisfied, it was considered desirable that the electromagnetic vibration suppression device itself determines a displacement amount of the steel plate and performs vibration suppression control.

The present invention has been devised in view of such problems and it is a main object of the present invention to provide an electromagnetic vibration suppression device capable of appropriately suppressing the vibration not only of a steel plate running with a normal posture but also of a steel plate running while meandering in the width direction without adopting a special sensor for edge position detection and a special meandering amount detection device as an essential structure and even in usage environments where information concerning a meandering amount is not provided from a host computer or the like.

It is another object of the present invention to provide an electromagnetic vibration suppression device capable of conveying a steel plate meandering in the width direction while maintaining the steel plate in an expected curved shape and capable of appropriately suppressing the vibration of the steel plate without adopting a special sensor for edge position detection and a special meandering amount detection device as an essential structure and even in usage environments where information concerning a meandering amount is not provided from a host computer or the like.

Solution to Problem

That is, the present invention relates to an electromagnetic vibration suppression device including a plurality of electromagnet pairs, which are sets of electromagnets arranged to be opposed to each other in the thickness direction of a steel plate running in a predetermined direction, in the width direction of the steel plate and configured to suppress, with a control unit which controls electric currents fed to the respective electromagnets, vibration of the steel plate running between the electromagnets of the respective electromagnet pairs. In the present invention, a conveying direction of the steel plate is not specifically limited. A steel plate conveyed in any direction such as a steel plate adapted to pass between the electromagnets while being pulled up, a steel plate adapted to pass between the electromagnets while being pulled down, or a steel plate adapted to pass between the electromagnets while horizontally moving is a vibration suppression target of the electromagnetic vibration suppression device of the present invention.

The electromagnetic vibration suppression device according to the present invention is characterized in that the respective electromagnet pairs excluding the electromagnet pairs arranged in a width direction center portion or near the width direction center portion of an electromagnet pair region where the plurality of electromagnet pairs are arranged in the width direction are attached with sensors capable of detecting presence of the steel plate between the electromagnets of the electromagnet pairs and, as the control unit, a control unit is applied which includes: pseudo displacement calculation means for calculating, as a pseudo displacement amount of the steel plate, a difference between the distance from a steel plate center position, which is a width direction center position of the steel plate in a regular state in which the steel plate does not meander in the width direction, to a switched sensor reference position based on at least one of the position of a sensor closest to the width direction center portion of the electromagnet pair region among sensors switched from an ON state in which the presence of the steel plate is detected between the electromagnets of the electromagnet pairs to an OFF state in which the presence of the steel plate is not detected between the electromagnets of the electromagnet pairs and the position of a sensor most distant from the width direction center portion of the electromagnet pair region among sensors switched from the OFF state to the ON state and a half length of a width dimension of the steel plate; pseudo edge position calculation means for calculating a pseudo edge position of the steel plate on the basis of the pseudo displacement amount calculated by the pseudo displacement amount calculation means; and current amount control means for individually controlling amounts of electric currents fed to the electromagnets on the basis of the pseudo edge position of the steel plate calculated by the pseudo edge position calculation means. Note that an output source which outputs the width dimension of the steel plate to the control unit may be either an apparatus (e.g., a host computer) different from the electromagnetic vibration suppression device or a part of the electromagnetic vibration suppression device. Timing for calculating a pseudo displacement amount of the steel plate and timing for calculating a pseudo edge position of the steel plate on the basis of the pseudo displacement amount only have to be real time or every predetermined time.

Such an electromagnetic vibration suppression device is configured to determine, with the pseudo displacement amount calculating means of the control unit, a switched sensor reference position on the basis of the position of a sensor (a sensor on the innermost side) closest from the width direction center portion of the electromagnet pair region among sensors switched from the ON state to the OFF state or the position of a sensor (a sensor on the outermost side) most distant from the width direction center portion of the electromagnet pair region among sensors switched from the OFF state to the ON state, calculate a pseudo displacement amount of the steel plate (a pseudo meandering amount of the steel plate) using the switched sensor reference position and information concerning the width dimension of the steel plate, and calculate a pseudo edge position of the steel plate with the pseudo edge position calculation means on the basis of the pseudo displacement amount. Therefore, even in a usage environment where information concerning an actual displacement amount (meandering amount) of the steel plate is not input to the control unit from the outside such as a host computer, it is possible to specify an approximate edge position (a pseudo edge position) of the steel plate without arranging sensors for detecting an edge position of the steel plate. The pseudo displacement amount calculating means calculates an approximate displacement amount of the steel plate as a pseudo displacement amount on the basis of position information of sensors switched between the ON state and the OFF state (switched sensor reference position). The pseudo displacement amount is less likely to coincide with an actual displacement amount of the steel plate. However, usually, an error between the actual displacement amount and the pseudo displacement amount is not larger than a separation dimension of sensors adjacent to each other. An error between a pseudo edge position calculated on the basis of such a pseudo displacement amount and an actual edge position of the steel plate is not larger than the separation dimension of the sensors adjacent to each other either. Taking notice of the fact that such errors are hardly problems in actual operation, the inventor has conceived of a configuration for calculating a pseudo edge position of the steel plate with the pseudo edge position calculation means actively using a pseudo displacement amount and individually adjusting electric currents fed to the respective electromagnets with the current amount control means on the basis of the pseudo edge position. By adopting such a configuration, even in a usage environment where information concerning an actual displacement amount (meandering amount) of the steel plate is not input to the control unit from the outside such as a host computer, it is possible to appropriately suppress the vibration of a steel plate running with a normal posture and a steel plate running while meandering in the width direction without arranging sensors for detecting an edge position of the steel plate.

In the electromagnetic vibration suppression device of the present invention, the current amount control means may perform control of output intensity of an electric current as "current amount control". However, when a simple control specification is adopted, it is preferable to adopt an aspect for setting an output current amount from the respective electromagnets to zero or a predetermined value equal to or larger than zero by switching the electromagnets only between an excited state and an unexcited state (ON/OFF of an electric current).

In this case, as a suitable control aspect by the current amount control means, for example, there is a form for switching electromagnets present further on a width direction center side of the steel plate than the pseudo edge position of the steel plate calculated by the pseudo edge position calculation means among the respective electromagnets to the excited state and switching the other electromagnets to the unexcited state.

Further, the control unit of the electromagnetic vibration suppression device according to the present invention can specify, with the current control means, an electromagnet pair in which the pseudo edge position of the steel plate calculated by the pseudo edge position calculation means is present between electromagnets and adjust, according to where the pseudo edge position is present in the specified electromagnet pair (an edge position specified electromagnet pair), a current amount for the electromagnets configuring the edge position specified electromagnet pair. As a specific control aspect of the control unit, for example, there is an aspect for outputting a current control signal for, when a plurality of electromagnet pairs are arranged in the electromagnet pair region, if it is discriminated that the pseudo edge position is present further on a width direction end (end portion) side of the electromagnet pair region than a predetermined value, which is set with the center in a width direction center of the electromagnets configuring the electromagnet pairs, in the edge position specified electromagnet pair, switching the electromagnets configuring the edge position specified electromagnet pair to the excited state and, if it is discriminated that the pseudo edge position is present further on the width direction center side of the electromagnet pair region than the predetermined value, switching the electromagnets configuring the edge position specified electromagnet pair to the unexcited state.

An electromagnetic vibration suppression program of the present invention is a program applied to the electromagnetic vibration suppression device configured as explained above, the program including: a pseudo displacement amount calculating step of calculating, as a pseudo displacement amount of a steel plate, a difference between the distance from a steel plate center position, which is a width direction center position of the steel plate in a regular state in which the steel plate does not meander in the width direction, to a switched sensor reference position based on at least one of the position of a sensor closest to a width direction center portion of an electromagnet pair region among sensors switched from an ON state to an OFF state and the position of a sensor most distant from the width direction center portion of the electromagnet pair region among sensors switched from the OFF state to the ON state and a half length of a width dimension of the steel plate; a pseudo edge position calculating step of calculating a pseudo edge position of the steel plate on the basis of the pseudo displacement amount calculated in the pseudo displacement amount calculating step; and a current amount controlling step of individually controlling amounts of electric currents fed to the electromagnets on the basis of the pseudo edge position of the steel plate calculated in the pseudo edge position calculating step. With such an electromagnetic vibration suppression program, it is possible to suppress vibration during running for a steel plate running while meandering.

The present invention relates to an electromagnetic vibration suppression device including a plurality of electromagnet pairs, which are sets of electromagnets arranged to be opposed to each other in the thickness direction of a steel plate running in a predetermined direction, in the width direction of the steel plate and configured to suppress, with a control unit which controls electric currents fed to the respective electromagnets, vibration of the steel plate running between the electromagnets of the respective electromagnet pairs in a shape curved in an opposing direction of the electromagnets. As the "curved shape of the steel plate", besides a general partial arc (including a partial elliptical arc (a bow shape)), a shape obtained by combining a plurality of partial arcs (a wavy shape or an S shape) can be illustrated. In the electromagnetic vibration suppression device of the present invention, a conveying direction of the steel plate is not specifically limited. A steel plate conveyed in any direction such as a steel plate adapted to pass between the electromagnets while being pulled up, a steel plate adapted to pass between the electromagnets while being pulled down, or a steel plate adapted to pass between the electromagnets while horizontally moving is a vibration suppression target of the electromagnetic vibration suppression device of the present invention.

The electromagnetic vibration suppression device according to the present invention is characterized in that the respective electromagnet pairs excluding the electromagnet pairs arranged in a width direction center portion or near the width direction center portion of an electromagnet pair region where the plurality of electromagnet pairs are arranged in the width direction are attached with sensors capable of detecting presence of the steel plate between the electromagnets of the electromagnet pairs and, as the control unit, a control unit is applied which includes: pseudo displacement amount calculation means for calculating, as a pseudo displacement amount of the steel plate, a difference between the distance from a steel plate center position, which is a width direction center position of the steel plate in a regular state in which the steel plate does not meander in the width direction, to a switched sensor reference position based on at least one of the position of a sensor closest to the width direction center portion of the electromagnet pair region among sensors switched from an ON state in which the presence of the steel plate is detected between the electromagnets of the electromagnet pairs to an OFF state in which the presence of the steel plate is not detected between the electromagnets of the electromagnet pairs and the position of a sensor most distant from the width direction center portion of the electromagnet pair region among sensors switched from the OFF state to the ON state and a half length of a width dimension of the steel plate; steel plate correction target position calculation means for calculating, on the basis of the pseudo displacement amount calculated by the pseudo displacement amount calculation means, a correction target position of the steel plate between the electromagnets configuring the respective electromagnet pairs such that the steel plate is curved in an expected curved shape; and current amount control means for individually controlling amounts of electric currents fed to the electromagnets configuring the respective electromagnet pairs to move the steel plate displaced in the width direction to correction target positions of the steel plate in the respective electromagnet pairs calculated by the steel plate correction target position calculation means.

Note that an output source which outputs the width dimension of the steel plate to the control unit may be either an apparatus (e.g., a host computer) different from the electromagnetic vibration suppression device or a part of the electromagnetic vibration suppression device. The "correction target positions of the steel plate in the respective electromagnet pairs" is synonymous with "correction target positions of the steel plate between the electromagnets configuring the respective electromagnet pairs". In the following explanation, for convenience of explanation, the "correction target positions of the steel plate in the respective electromagnet pairs" is described as "positions of the steel plate in the electromagnet pairs". This description is synonymous with "positions of the steel plate between the electromagnets configuring the electromagnet pairs". Timing for calculating a pseudo displacement amount of the steel plate and timing for calculating a correction target position of the steel plate on the basis of the pseudo displacement amount only has to be real time or every predetermined time.

With such an electromagnetic vibration suppression device, even in a usage environment where information concerning an actual displacement amount (meandering amount) is not input to the control unit from the outside such as a host computer, it is possible to determine, with the pseudo displacement amount calculating means of the control unit, a switched sensor reference position on the basis of the position of a sensor (a sensor on the innermost side) closest from the width direction center portion of the electromagnet pair region among sensors switched from the ON state to the OFF state or the position of a sensor (a sensor on the outermost side) most distant from the width direction center portion of the electromagnet pair region among sensors switched from the OFF state to the ON state and calculate a pseudo displacement amount of the steel plate (a pseudo meandering amount of the steel plate) using the switched sensor reference position and information concerning the width dimension of the steel plate. The pseudo displacement amount calculating means calculates an approximate displacement amount of the steel plate as a pseudo displacement amount on the basis of position information of sensors switched between the ON state and the OFF state (switched sensor reference position). The pseudo displacement amount is less likely to coincide with an actual displacement amount of the steel plate. However, usually, an error between the actual displacement amount and the pseudo displacement amount is not larger than a separation dimension of sensors adjacent to each other. The error is hardly a problem in actual operation. Taking notice of this point, the inventor has conceived of a configuration for calculating, with the steel plate correction target position calculation means, a correction target position of the steel plate between the electromagnets configuring the respective electromagnet pairs actively using a pseudo displacement amount such that the steel plate is curved in an expected curved shape and individually adjusting electric currents fed to the respective electromagnets with the current amount control means on the basis of the correction target position calculated by arithmetic processing in the steel plate correction target position calculation means. By adopting such a configuration, even in a usage environment where information concerning an actual displacement amount (meandering amount) of the steel plate is not input to the control unit from the outside such as a host computer, it is possible to move the positions of the steel plate in the respective electromagnet pairs to the correction target positions and, even when the steel plate meanders, induce (rectify) the steel plate to a curved shape same as or substantially same as the expected curved shape in a meandering position. Therefore, with the electromagnetic vibration suppression device of the present invention which displays appropriate vibration suppression action for the steel plate running in the expected curved shape, by keeping the meandering steel plate in the expected curved shape in the meandering position, it is possible to appropriately suppress the vibration of the steel plate running while meandering.

In the electromagnetic vibration suppression device of the present invention, a curved shape of the steel plate at a point before being displaced in the width direction, i.e., the expected curved shape of the steel plate is approximated by a straight line connecting expected target positions of the steel plate in the respective electromagnet pairs adjacent to one another. The steel plate correction target position calculation means can be configured as steel plate correction target position calculation means for calculating, for each of the electromagnet pairs, a correction target position of the steel plate using respective expected target positions of the steel plate in a target electromagnet pair, for which a correction target position of the steel plate is calculated, and an electromagnet pair adjacent to the electromagnet pair, a pseudo displacement amount, and the distance between the electromagnet pairs adjacent to each other. The "expected target positions of the steel plate in the respective electromagnet pairs" are target positions of steel plate set in advance or on a real time basis for each of the electromagnet pairs such that the steel plate is curved in an expected curved shape in an un-meandering state. As a specific example of the "expected target positions of the steel plate in the respective electromagnet pairs", when five electromagnet pairs are arranged at a predetermined pitch in the width direction of the steel plate and a steel plate having a symmetrical partial arc shape is conveyed by the electromagnetic vibration suppression device in which an electromagnet pair in the center and a width direction center of an un-meandering steel plate are matched or substantially matched, expected target positions of the steel plate in electromagnet pairs at both ends coincide with or substantially coincide with a direction in which electromagnets configuring the respective electromagnets pairs are opposed to each other and expected target positions of the steel plate in electromagnet pairs adjacent to the electromagnet pairs at both the ends (when the electromagnet pairs are a first electromagnet pair, a second electromagnet pair, a third electromagnet pair, a fourth electromagnet pair, and a fifth electromagnet pair in order from one end side, the second electromagnet pair and the fourth electromagnet pair) coincide with or substantially coincide with a direction in which electromagnets configuring the respective electromagnet pairs are opposed to each other.

In the present invention, on the basis of the technical idea that, even when an expected curved shape of the steel plate is approximated as a shape formed by connecting expected target positions of the steel plates in the respective electromagnet pairs with a straight line and the steel plate meanders, the steel plate has a shape same as or substantially same as the expected curved shape even in a meandering position if the shape of the steel plate approximated by the straight line is retained in a state in which the shape is translated in the width direction of the steel plate, the steel plate correction target position calculation means can calculate each of correction target positions of the steel plate in the respective electromagnet pairs using expected target position of the steel plate in the respective electromagnet pairs, the distance between the electromagnet pairs adjacent to each other, and a pseudo meandering amount of the steel plate. With such an aspect, it is possible to calculate, with the steel plate correction target position calculation means, correction target positions of the steel plate in the respective electromagnet pairs with a small calculation amount simply by using a "pseudo displacement amount of the steel plate" calculated on a real time basis or at every predetermined time in addition to "expected target position of the steel plate in the respective electromagnet pair" and a "distance between the electromagnet pairs adjacent to each other", which are default values set in advance.

As a suitable example of the arithmetic processing in the steel plate correction target position calculation means, there is arithmetic processing for calculating, respectively as coordinates on a common plane, an expected target position of the steel plate in an electromagnet pair for which a correction target position of the steel plate is calculated (hereinafter referred to as "correction target position calculation target electromagnet pair") and an expected target position of the steel plate in an electromagnet pair adjacent to the correction target position calculation target electromagnet pair, calculating a difference between the coordinates, more specifically, a difference between coordinates along which an opposing direction of electromagnets configuring the electromagnet pairs extends, calculating a difference between a correction target position of the steel plate in the correction target position calculation target electromagnet pair and an expected target position of the steel plate in the electromagnet pair adjacent to the correction target position calculation target electromagnet pair, and calculating each of correction target positions of the steel plate in the respective electromagnet pairs making use of the fact that a first relative ratio, which is a ratio of the differences, which are results of the two calculations, is equal to a second relative ratio, which is a ratio of a separation distance between the electromagnet pairs adjacent to each other and a value obtained by subtracting the pseudo displacement amount of the steel plate from the separation distance.

In the electromagnetic vibration suppression device of the present invention, the current amount control means may perform control of output intensity of an electric current as "current amount control". However, when a simple control specification is adopted, it is preferable to adopt an aspect for setting an output current amount from the respective electromagnets to zero or a predetermined value equal to or larger than zero by switching the electromagnets only between the excited state and the unexcited state (ON/OFF of an electric current).

An electromagnetic vibration suppression program of the present invention is a program applied to the electromagnetic vibration suppression device configured as explained above, the program including: a pseudo displacement amount calculating step of calculating, as a pseudo displacement amount of a steel plate, a difference between the distance from a steel plate center position, which is a width direction center position of the steel plate in a regular state in which the steel plate does not meander in the width direction, to a switched sensor reference position based on at least one of the position of a sensor closest to a width direction center portion of an electromagnet pair region among sensors switched from an ON state in which the presence of the steel plate is detected between electromagnets of an electromagnet pair to an OFF state in which the presence of the steel plate is not detected between the electromagnets of the electromagnet pair and the position of a sensor most distant from the width direction center portion of the electromagnet pair region among sensors switched from the OFF state to the ON state and a half length of a width dimension of the steel plate; a steel plate correction target position calculating step of calculating, on the basis of the pseudo displacement amount calculated in the pseudo displacement amount calculating step, a correction target position of the steel plate between the electromagnets configuring the respective electromagnet pairs such that the steel plate is curved in an expected curved shape; and a current amount controlling step of individually controlling amounts of electric currents fed to the electromagnets configuring the respective electromagnet pairs to move the steel plate displaced in the width direction to correction target positions of the steel plate in the respective electromagnet pairs calculated in the steel plate correction target position calculating step. With such an electromagnetic vibration suppression program, it is possible to convey the steel plate running while meandering in a state in which a curved shape of the steel plate is maintained in an expected curved shape and effectively suppress vibration during the running.

Advantageous Effects of Invention

With the electromagnetic vibration suppression device of the present invention, even in a usage environment where a meandering amount of the steel plate is not provided from a host computer, without adopting a special edge position detection sensor or a meandering amount detection device as an essential structure, it is possible to appropriately suppress the vibration of the steel plate running with a normal posture and effectively suppress the vibration of the steel plate running while meandering.

With the electromagnetic vibration suppression device of the present invention, even in a usage environment where a meandering amount of the steel plate is not provided from a host computer, without adopting a special edge position detection sensor or a meandering amount detection device as an essential structure, it is possible to suppress the vibration of the steel plate running in an expected curved shape without meandering and effectively suppress the vibration of the steel plate running while meandering while maintaining a curved shape.

DESCRIPTION OF EMBODIMENTS

Embodiments of the present invention are explained below as a first embodiment and a second embodiment with reference to the drawings.

Figure 1:
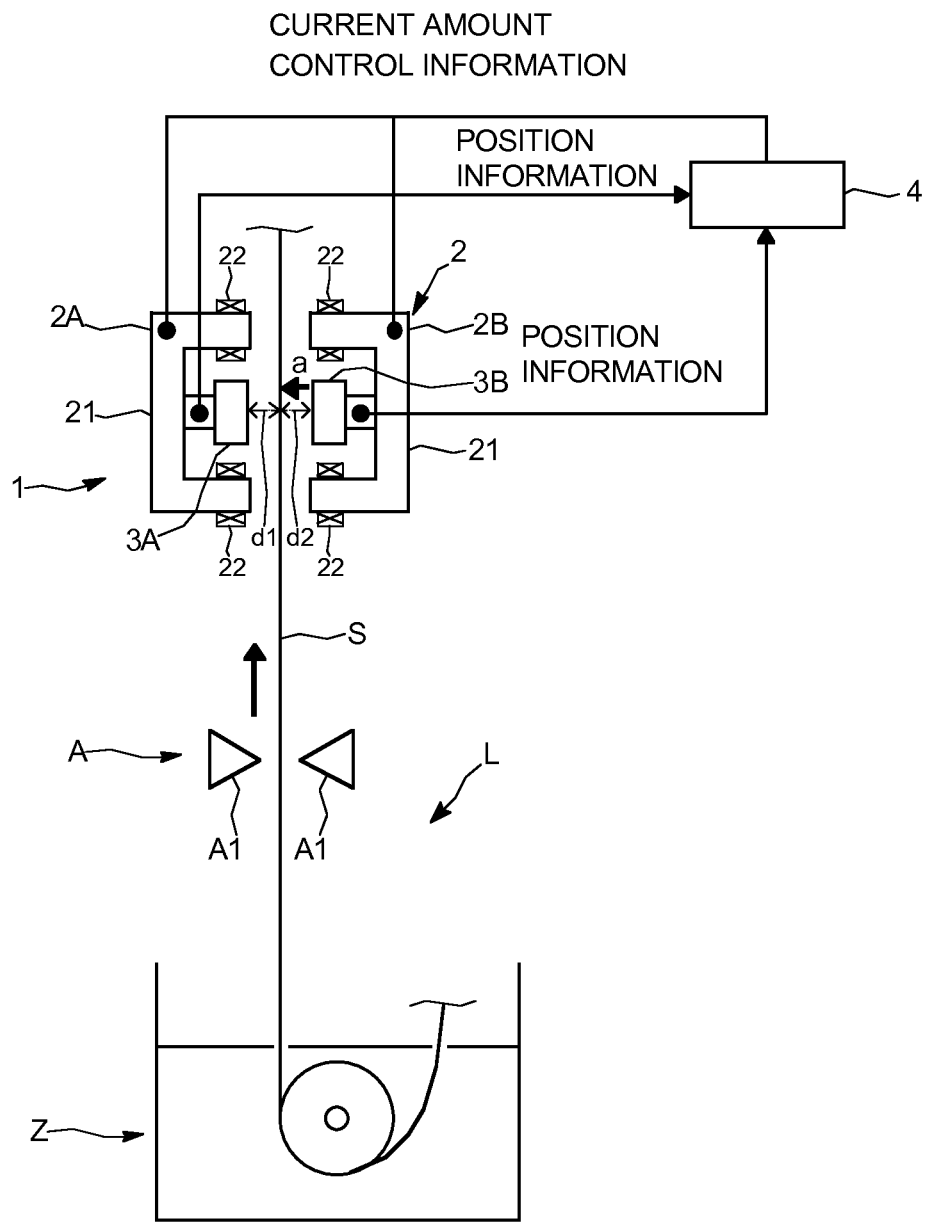
FIG. 1 is an overall configuration schematic diagram of an electromagnetic vibration suppression device according to a first embodiment of the present invention.

As shown in FIG. 1, an electromagnetic vibration suppression device 1 according to the first embodiment is disposed further on a downstream side than a molten metal tank (in this embodiment, a molten zinc tank Z is applied) in a continuous galvanized steel plate line L. The electromagnetic vibration suppression device 1 suppresses the vibration of a steel plate S which passes the molten zinc tank Z and runs while being pulled up. Note that, in FIG. 1, a state in which the steel plate S is viewed from a side surface is schematically shown and, in FIG. 2, an "a" direction arrow view of FIG. 1 is schematically shown.

In the continuous galvanized steel plate line L (in particular, a galvanized steel plate line in which molten zinc is used is referred to as "Continuous Galvanizing Line" (CGL)), an air knife unit A including nozzles A1, jetting ports of which are directed to the steel plate S, is provided between the molten zinc tank Z and the electromagnetic vibration suppression device 1. Excess molten zinc is blown off by jetting pressurized air or pressurized gas from the jetting ports of the respective nozzles A1 to the steel plate S which passes the molten zinc tank Z and runs while being pulled up. As the molten zinc tank Z and the air knife unit A, known ones can be applied. Detailed explanation thereof is omitted.

Figure 2:
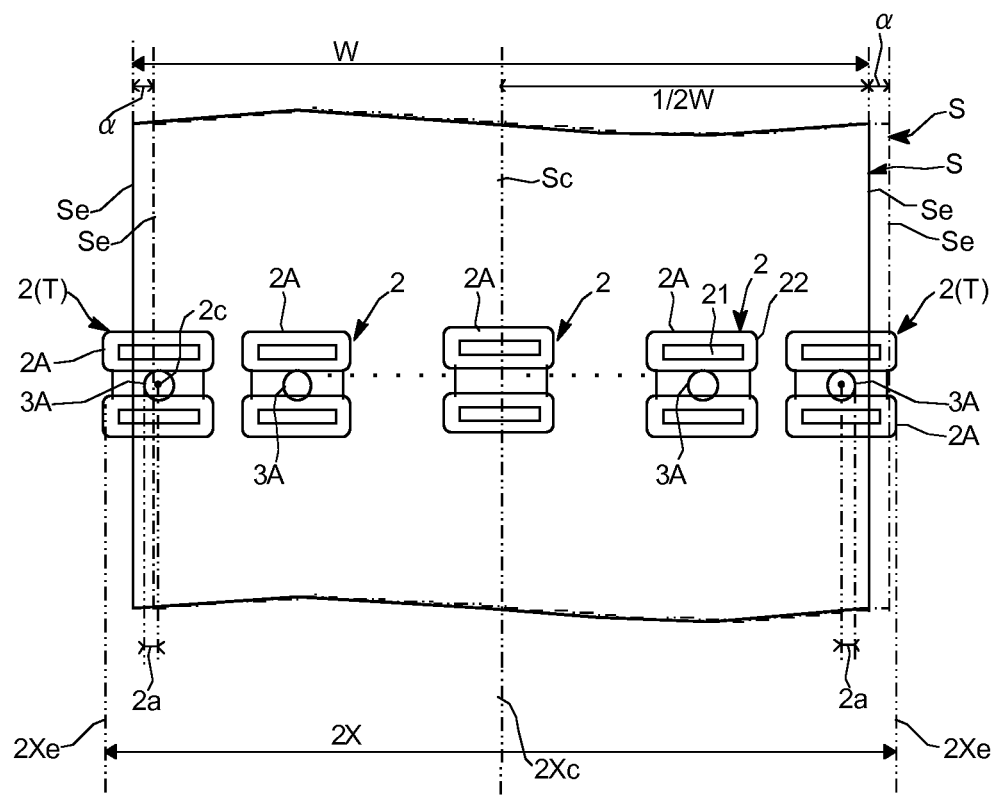
FIG. 2 is an "a" direction schematic arrow view of FIG. 1.

In the electromagnetic vibration suppression device 1, as shown in FIGS. 1 and 2, a plurality of electromagnet pairs 2, which are sets of first electromagnets 2A and second electromagnets 2B arranged to be opposed to each other in a position where the electromagnets can hold the steel plate S in the thickness direction, are arranged in the width direction of the steel plate S at a predetermined pitch. Each of the first electromagnets 2A and the second electromagnets 2B configuring the respective electromagnet pairs 2 is configured by an iron core 21 formed in a C shape or a substantial C shape in cross section and coils 22 wound around respective legs of the iron core 21 and is a known electromagnet which can be switched, according to whether electric power is fed to the coils 22, between an excited state in which magnetic attraction force can be output from the iron core 21 and an unexcited state in which magnetic attraction force is not output from the iron core 21, the intensity of the magnetic attraction force being adjustable according to a power feed amount to the coils 22. In the first embodiment, as shown in FIG. 2, the plurality of electromagnet pairs 2 are disposed in the width direction of the steel plate S at the predetermined pitch. In the following explanation, a region where the plurality of electromagnet pairs 2 are disposed is referred to as "electromagnet pair region 2X".

Figure 5:
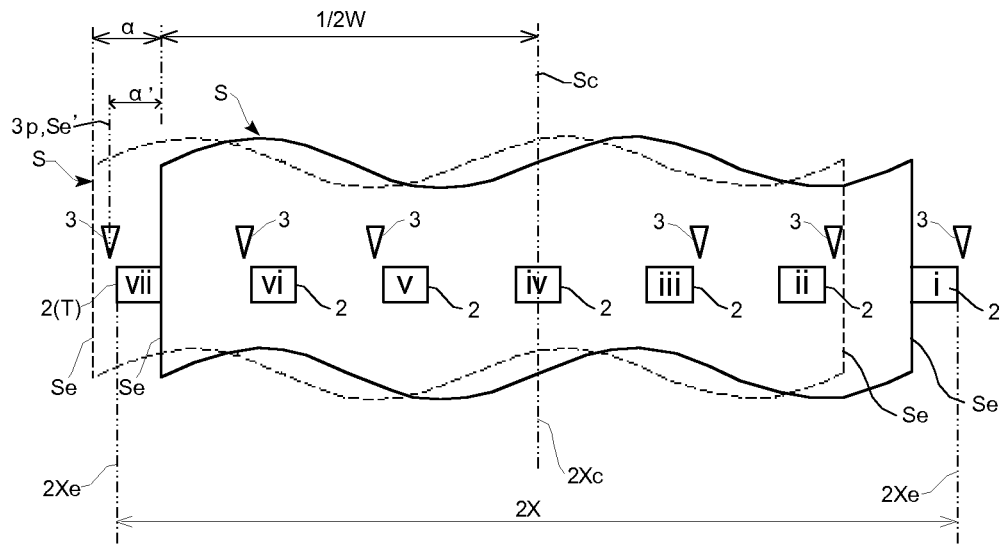
FIG. 5 is a conceptual diagram in calculating a pseudo displacement amount in the embodiment.

In the electromagnetic vibration suppression device 1, first sensors 3A and second sensors 3B configured to detect a distance to the steel plate S are provided on surfaces of the respective first electromagnets 2A and the respective electromagnets 2B opposed to the steel plate S. In the first embodiment, for example, sensors 3A and 3B of an eddy current type are applied. The sensors 3A and 3B are arranged in concave portions (positions which can be held by the legs of the iron core 21) of the respective electromagnets 2A and 2B. Detection surfaces of the first sensors 3A and the second sensors 3B are set on surfaces same as or substantially same as magnetic pole surfaces of the respective electromagnets 2A and 2B respectively corresponding thereto. The first sensors 3A and the second sensors 3B are provided in positions opposed to each other across the steel plate S. The first sensors 3A and the second sensors 3B detect distances d1 and d2 to the steel plate S and output detection results of the sensors to a control unit 4 as detection signals. Note that, in the first embodiment, the sensors 3A and 3B are set to be capable of detecting a distance to the steel plate S only in a state in which the entire detection surfaces of the sensors 3A and 3B are completely or substantially completely covered by the steel plate S. One pair of the sensors 3A and 3B are associated with the respective electromagnet pairs 2. In the following explanation, one pair of the sensors 3A and 3B provided to be associated with one electromagnet pair 2 are sometimes generally simply referred to as "sensor 3". As shown in FIG. 2, a layout in which the center (a detection point) of the sensor 3 is matched or substantially matched with a width direction center 2c of the electromagnet pair 2 can be adopted. As shown in FIG. 5, a layout in which the center (the detection point) of the sensor 3 is matched or substantially matched with end portions of the respective electromagnet pairs 2, more specifically, an end portion relatively distant from the width direction center portion 2Xc of the electromagnet pair region 2X in the electromagnet pair 2 can be adopted. As shown in FIGS. 2 and 5, the sensor 3 is not provided in the electromagnet pair 2 (the electromagnet pair 2 affixed with "iv" in FIG. 5) arranged in the width direction center portion 2Xc of the electromagnet pair region 2X among all the electromagnet pairs 2. This is because it is difficult to assume that the steel plate S meanders to a degree in which an edge position of the steel plate S passes the electromagnet pair 2 arranged in the width direction center portion 2Xc of the electromagnet pair region 2X. Note that the sensor 3 may be also provided in the electromagnet pair 2 arranged in the width direction center portion 2Xc of the electromagnet pair region 2X. The sensor 3 may be configured to determine that an abnormal situation occurs and forcibly stop the electromagnetic vibration suppression device 1 at a point when the sensor 3 is switched from an ON state in which the presence of the steel plate S is detected between the electromagnets 2A and 2B of the electromagnet pair 2 to an OFF state in which the presence of the steel plate S is not detected between the electromagnets 2A and 2B of the electromagnet pair 2. In FIG. 2 and FIGS. 5 to 8, the steel plate S in a regular state is indicated by a solid line and the meandering steel plate S is indicated by an alternate long and short dash line or a broken line.

The electromagnetic vibration suppression device 1 according to the first embodiment includes the control unit 4 electrically connected to the electromagnets 2A and 2B of the respective electromagnet pairs 2 and configured to control magnetic attraction force of the respective electromagnets 2A and 2B based on amounts of electric currents fed to the respective electromagnets 2A and 2B. The electromagnetic vibration suppression device 1 is the same as a well-known electromagnetic vibration suppression device in that the control unit 4 is also electrically connected to the respective sensors 3A and 3B and the control unit 4 controls the magnetic attraction force of the respective electromagnets 2A and 2B to suppress the vibration of the steel plate S on the basis of position information of the steel plate S (vibration information of the steel plate S) detected by the respective sensors 3A and 3B. However, the electromagnetic vibration suppression device 1 according to the first embodiment is different from the well-known electromagnetic vibration suppression device as explained below.

Figure 3:
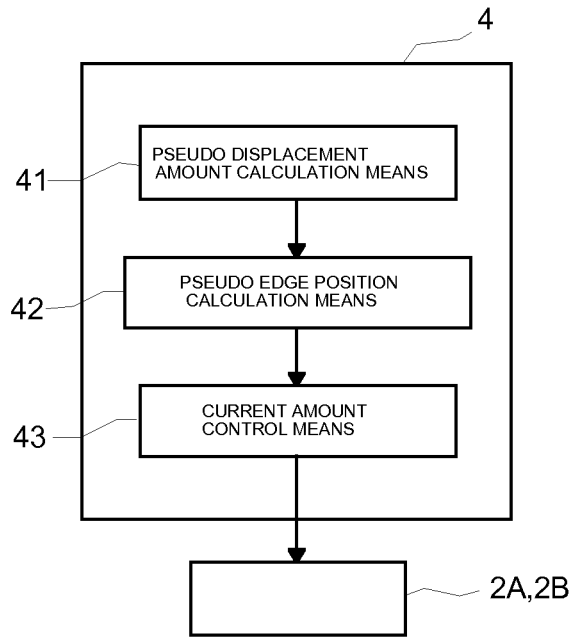
FIG. 3 is a functional block diagram of a control unit in the electromagnetic vibration suppression device according to the embodiment.

That is, as shown in FIG. 3, the control unit 4 in the electromagnetic vibration suppression device 1 according to the first embodiment includes pseudo displacement amount calculation means 41 for calculating a pseudo displacement amount $\alpha'$, which is a pseudo displacement amount (a meandering amount), in the width direction of the steel plate S using the position of the sensor 3 switched between the ON state and the OFF state during the transfer of the steel plate S, pseudo edge position calculation means 42 for calculating a pseudo edge position Se' of the steel plate S on the basis of the calculated pseudo displacement amount $\alpha'$ (pseudo meandering amount), and current amount control means 43 for individually controlling amounts of electric currents fed to the electromagnets 2A and 2B on the basis of the pseudo edge position Se' of the steel plate S calculated by the pseudo edge position calculation means 42.

The pseudo displacement amount calculation means 41 calculates, as the pseudo displacement amount $\alpha'$ of the steel plate S, a difference between the distance from the steel plate center position Sc, which is a width direction center position of the steel plate S in a regular state in which the steel plate S does not meander in the width direction, to a "switched sensor reference position 3p", which is at least one of the position of a sensor (a sensor on the innermost side) closest to the width direction center portion 2Xc of the electromagnet pair region 2X among the sensors 3 switched from the ON state to the OFF state and the position of a sensor (a sensor on the outermost side) most distant from the width direction center portion 2Xc of the electromagnet pair region 2X among the sensors 3 switched from the OFF state to the ON state and a half length of a width dimension of the steel plate S. The pseudo displacement amount calculation means 41 can be grasped as means for calculating the pseudo displacement amount $\alpha'$ of the steel plate S with a primary calculating unit configured to calculate a distance (provisional meandering width) from the steel plate center position Sc to the switched sensor reference position 3p and a secondary calculating unit configured to calculate a difference between the provisional meandering width calculated by the primary calculating unit and the half length of the width dimension of the steel plate S.

The pseudo edge position calculation means 42 calculates, on the basis of the pseudo displacement amount $\alpha'$ calculated by the pseudo displacement amount calculation means 41, the pseudo edge position Se' of the steel plate S running in the electromagnet pair region 2X. When the steel plate S runs in the electromagnet pair region 2X with a normal posture without meandering (a regular state), as indicated by solid lines in FIGS. 2 and 5, the width direction center Sc of the steel plate S coincides with the width direction center 2Xc of the electromagnet pair region 2X and the edge position Se of the steel plate S coincides with or substantially coincides with a position apart from the width direction center Sc of the steel plate S (=the width direction center 2Xc of the electromagnet pair region 2X) by a distance equal to a half (½) of the width dimension of the steel plate S. When the width dimension of the steel plate S is represented by "W", the edge position Se of the steel plate S in the regular state can be represented by "½ W" with reference to the width direction center 2Xc of the electromagnet pair region 2X.

The pseudo edge position calculation means 42 can perform arithmetic processing using the pseudo meandering amount $\alpha'$ rather than an actual meandering amount $\alpha$ and calculate the pseudo edge position Se' of the steel plate S as "½ W±$\alpha'$". In the first embodiment, as shown in FIGS. 5 to 8, the pseudo edge position Se' of the steel plate S is in a coinciding relation with the "switched sensor reference position 3p". The pseudo edge position calculation means 42 is set to calculate, when the pseudo edge position Se' meanders further to one end (the sensor 3 "i" at the right end in FIGS. 5 to 8) side from the width direction center 2Xc of the electromagnet pair region 2X than the edge position "½ W" of the steel plate S in the regular state, the pseudo edge position Se' as "½ W+$\alpha$" (see FIGS. 6 and 8) and calculate, when the pseudo edge position Se' of the steel plate S meanders further to the other end (the sensor 3 "vii" at the left end in FIGS. 5 to 8) side from the width direction center 2Xc of the electromagnet pair region 2X than the edge "½ W" of the steel plate S in the regular state, the pseudo edge position Se' as "½ W−α".

In this way, the pseudo edge position Se' of the steel plate S being conveyed is calculated by the pseudo meandering amount calculation means 41 and the pseudo edge position calculation means 42 of the control unit 4. Consequently, even in a usage environment where a meandering amount (meandering amount information) of the steel plate S based on an actual edge position of the steel plate S detected by, for example, a special edge position detector is not input from the outside (e.g., a host computer), the electromagnetic vibration suppression device 1 according to the first embodiment can adjust amounts of electric currents fed to the electromagnets 2A and 2B with the current amount control means 43 using the pseudo edge position Se' and display an appropriate vibration suppression function. Note that information concerning the line L side, i.e., plate thickness, plate width, steel type, tension, and the like, which are information concerning the running steel plate S, may be input to the control unit 4 on a real time basis or every fixed time set in advance.

The current amount control means 43 specifies, on the basis of the pseudo edge position "½ W±α'" calculated by the pseudo edge position calculation means 42, the electromagnet pair 2 in which the pseudo edge position Se' is present between the electromagnets 2A and 2B, sets the respective electromagnets 2A and 2B configuring the electromagnet pair 2 arranged further on the width direction center 2Xc side of the electromagnet pair region 2X than the specified electromagnet pair 2 (hereinafter referred to as "edge position specified electromagnet pair 2(T)") to a drivable state, and sets the electromagnets 2A and 2B configuring the electromagnet pair 2 arranged further on the width direction end 2Xe of the electromagnet pair region 2X than the edge position specified electromagnet pair 2(T) to an un-driven state.

Further, simultaneously or substantially simultaneously with specifying, on the basis of "½ W±α'", which is the pseudo edge position Se' of the steel plate S calculated by the pseudo edge position calculation means 42, the electromagnet pair 2 in which the pseudo edge position "½ W±α'" is present between the electromagnets 2A and 2B, the current amount control means 43 in the first embodiment discriminates whether the pseudo edge position Se' is present further on the width direction end 2Xe side of the electromagnet pair region 2X than a predetermined value 2a (see FIG. 2) set with the center in the width direction center 2c of the electromagnets 2A and 2B configuring the edge position specified electromagnet pair 2(T). When discriminating that the pseudo edge position Se' of the steel plate S is present further on the width direction end 2Xe side of the electromagnet pair region 2X than the predetermined value 2a (the pseudo edge position Se' on the right side on the paper surface of the steel plate S indicated by an alternate long and short dash line in FIG. 2), the current amount control means 43 switches the electromagnets 2A and 2B configuring the edge position specified electromagnet pair 2(T) to an excited state (On). On the other hand, when discriminating that the pseudo edge position Se' of the steel plate S is absent further on the width direction end 2Xe side of the electromagnet pair region 2X than the predetermined value 2a (the pseudo edge position Se' on the left side of the paper surface of the steel plate S indicated by the alternate long and short dash line in FIG. 2), the current amount control means 43 switches the electromagnets 2A and 2B configuring the edge position specified electromagnet pair 2(T) to an unexcited state (Off). When the current amount control means 43 discriminates that the pseudo edge position Se' of the steel plate S is absent further on the width direction end 2Xe side of the electromagnet pair region 2X than the predetermined value 2a, the pseudo edge position Se' of the steel plate S is present within the predetermined value 2a (the pseudo edge position Se' on the left side on the paper surface of the steel plate S indicated by the alternate long and short dash line in FIG. 2) or the pseudo edge position Se' of the steel plate S is present further on the width direction center 2Xc side of the electromagnet pair region 2X than the predetermined value 2a (not shown in the figure). Note that, as explained above, in the aspect illustrated in FIGS. 5 to 8, arrangement places of the sensors 3 in the respective electromagnet pairs 2 are set in positions displaced from the width direction center 2c of the electromagnets 2A and 2B to further on the end 2Xe side of the electromagnet pair region 2X than the predetermined value 2a. Note that the "predetermined value 2a" set with the center in the width direction center 2c of the electromagnets 2A and 2B configuring the edge position specified electromagnet pair 2(T) may be changed as appropriate.

The control unit 4 in the first embodiment controls, on the basis of the distance between the steel plate S and the respective electromagnets 2A and 2B detected by the respective sensors 3A and 3B, i.e., vibration information of the steel plate S (whether the steel plate S is vibrating and, when the steel plate S is vibrating, a degree of the vibration (a vibration amount)), the magnitude of amounts of electric currents fed to the electromagnets 2A and 2B in the excited state to rectify the bend of the steel plate S and suppresses the vibration of the steel plate S. Note that, although not shown in the figure, the control unit 4 includes a controller to which output signals from the respective sensors 3A and 3B are input, a sequencer configured to output, for example, a command concerning a control gain to the controller, and a first amplifier and a second amplifier configured to respectively supply electric currents to the respective electromagnets 2A and 2B on the basis of a command (current amount control information (a current amount control signal)) output by the controller concerning electric currents fed to the respective electromagnets 2A and 2B. However, detailed explanation of the controller, the sequencer, and the respective amplifiers is omitted.

Next, a using method and action of the electromagnetic vibration suppression device 1 having such a configuration is explained.

Figure 6:
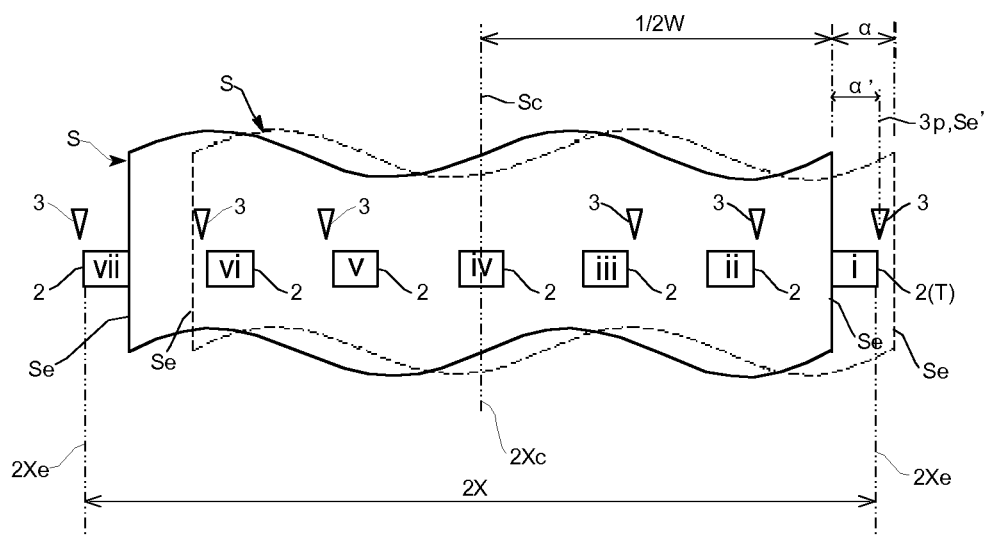
FIG. 6 is a conceptual diagram in calculating a pseudo displacement amount in the embodiment.

The electromagnetic vibration suppression device 1 executes an electromagnetic vibration suppression program according to the first embodiment to cause the respective units to operate as explained below. First, as shown in FIG. 1, the electromagnetic vibration suppression device 1 calculates, with the pseudo displacement amount calculation means 41 of the control unit 4, the pseudo displacement amount α' of the steel plate S passing the molten zinc tank Z and running between the first electromagnet 2A and the second electromagnet 2B while being pulled up (a pseudo displacement amount calculating step S1; see FIG. 4). Specifically, as shown in FIGS. 5 and 6, when the steel plate S having a width dimension, with which the sensors 3 attached to the electromagnet pairs 2 (electromagnet pairs "i" and "vii" shown in FIGS. 5 and 6) at the width direction both ends 2Xe of the electromagnet pair region 2X is switched to the OFF state in the regular state, meanders to one end side (in FIG. 5, the left side on the paper surface and, in FIG. 6, the right side on the paper surface) in the width direction of the electromagnet pair region 2X and only the sensor 3 attached to the electromagnet pair 2 arranged on the one end side 2Xe (in FIG. 5, the sensor 3 attached to the electromagnet pair "vii" at the left end and, in FIG. 6, the sensor 3 attached to the electromagnet pair "i" at the right end) is switched from the OFF state to the ON state, the pseudo displacement amount calculating means 41 calculates the pseudo displacement amount α' according to a procedure explained below. The pseudo displacement amount calculating means 41 sets, as the switched sensor reference position 3p, the position of the sensor 3 (the sensor 3 on the outermost side) most distant from the width direction center portion 2Xc of the electromagnet pair region 2X among the sensors 3 switched from the OFF state to the ON state, calculates the distance from the switched sensor reference position 3p to the steel plate center position Sc, calculates a difference between the distance and a half length of the width dimension of the steel plate S, and sets a calculated value as the pseudo displacement amount α'. As shown in FIGS. 5 and 6, when there is no sensor 3 switched from the ON state to the OFF state according to meandering of the steel plate S, it is possible to calculate the pseudo displacement amount α' taking notice of only the sensor switched from the OFF state to the ON state described above (the sensor 3 attached to the electromagnet pair vii or the sensor 3 attached to the electromagnet pair i). A formula for calculating the pseudo displacement amount α' in such a case, i.e., taking notice of only the sensor 3 switched from the OFF state to the ON state when the steel plate S meanders is "(the distance from the steel plate center position Sc to the switched sensor reference position 3p)—a half of the width dimension of the steel plate S".

Figure 7:
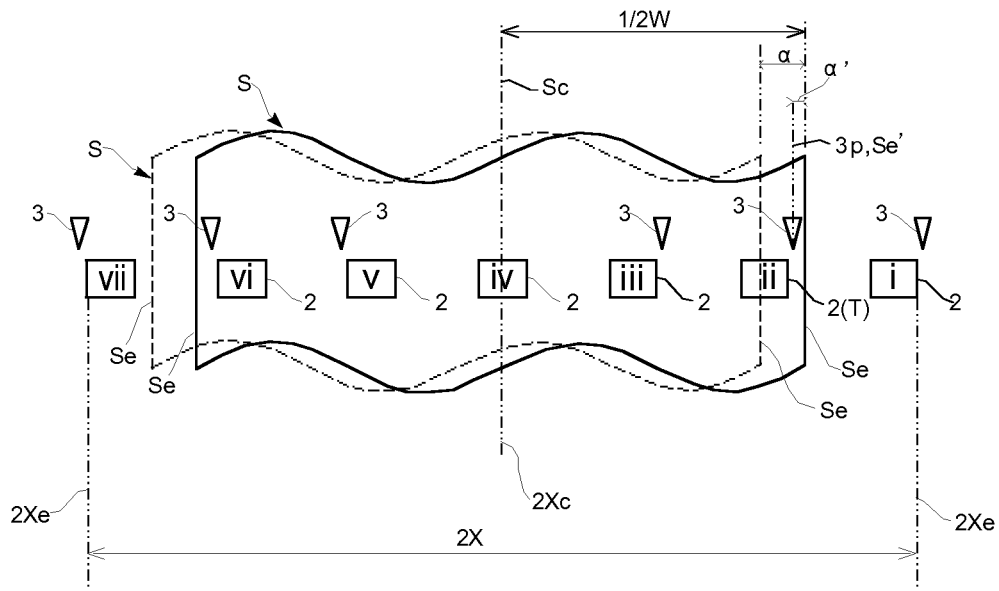
FIG. 7 is a conceptual diagram in calculating a pseudo displacement amount in the embodiment.
Figure 8:
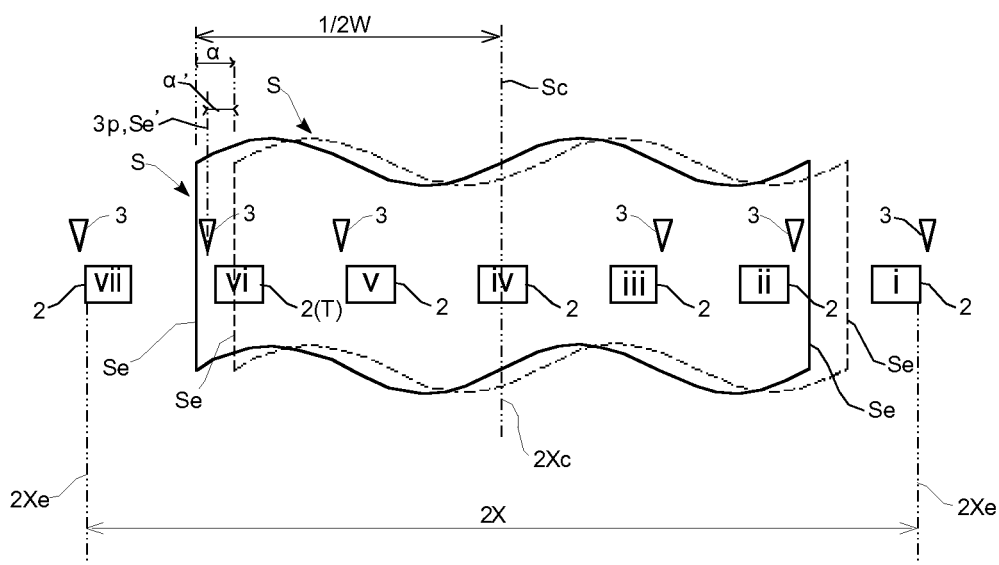
FIG. 8 is a conceptual diagram in calculating a pseudo displacement amount in the embodiment.

As shown in FIGS. 7 and 8, when the steel plate S having a width dimension, with which the sensors 3 attached to the electromagnet pairs 2 (electromagnet pairs "i" and "vii" shown in FIGS. 7 and 8) at the width direction both ends 2Xe of the electromagnet pair region 2X is switched to the OFF state in the regular state, smaller than the width dimension of the steel plate S shown in FIGS. 5 and 6 meanders to any one end 2Xe side in the electromagnet pair arrangement region 2X (in FIG. 7, the left side on the paper surface and, in FIG. 8, the right side on the paper surface) and the sensor 3 attached to the electromagnet pair 2 arranged on the other end side (in FIG. 7, the sensor 3 attached to the second electromagnet pair "vi" from the right and, in FIG. 8, the sensor 3 attached to the second electromagnet pair "ii" from the left) is switched from the ON state to the OFF state, the pseudo displacement amount calculating means 41 calculates the pseudo displacement amount α' according to a procedure explained below. That is, the pseudo displacement amount calculating means 41 sets, as the switched sensor reference position 3p, the position of the sensor 3 (the sensor 3 on the innermost side) closest to the width direction center portion 2Xc of the electromagnet pair region 2X among the sensors 3 switched from the ON state to the OFF state, calculates the distance from the switched sensor reference position 3p to the steel plate center position Sc, calculates a difference between the distance and a half length of the width dimension of the steel plate S, and sets the calculated value as the pseudo displacement amount α'. As shown in FIGS. 7 and 8, when there is no sensor 3 switched from the OFF state to the ON state according to meandering of the steel plate S, it is possible to calculate the pseudo displacement amount α' taking notice of only the sensor 3 switched from the ON state to the OFF state described above (in FIG. 7, the sensor 3 attached to the second electromagnet pair "vi" from the right and, in FIG. 8, the sensor 3 attached to the second electromagnet pair "ii" from the left). A formula for calculating the pseudo displacement amount α' in such a case, i.e., taking notice of only the sensor 3 switched from the ON state to the OFF state when the steel plate S meanders is "a half of the width dimension of the steel plate S—(the distance from the steel plate center position Sc to the switched sensor reference position 3p)".

Figure 4:
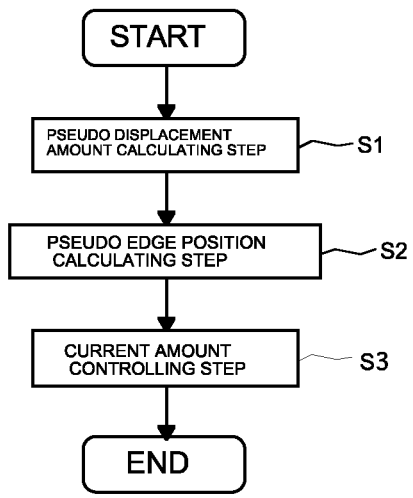
FIG. 4 is a flowchart of an electromagnetic vibration suppression program used for the electromagnetic vibration suppression device according to the embodiment.

Subsequently, the electromagnetic vibration suppression device 1 according to the first embodiment calculates, with the pseudo edge position calculation means 42 of the control unit 4, on the basis of the pseudo displacement amount α' calculated by the pseudo displacement amount calculation means 41, the pseudo edge position Se' of the steel plate S being conveyed (a pseudo edge position calculating step S2; see FIG. 4). In the first embodiment, the switched sensor reference position 3p is equal to the pseudo edge position Se'. Subsequently, the control unit 4 individually controls, on the basis of "½ W±α'", which is the pseudo edge position Se' of the steel plate S calculated by the pseudo edge position calculation means 42, amounts of electric currents fed to the electromagnets 2A and 2B (a current amount control step S3; see FIG. 4). Specifically, the control unit 4 specifies the electromagnet pair 2 in which the pseudo edge position Se' of the steel plate S calculated by the pseudo edge position calculation means 42 is present between the electromagnets 2A and 2B. The control unit 4 discriminates whether, in the specified electromagnet pair 2 (the edge position specified electromagnet pair 2(T)), the pseudo edge position Se' of the steel plate S is present further on the width direction end 2Xe side of the electromagnet pair region 2X than the predetermined value 2a with the reference set in the width direction center 2c of the electromagnets 2A and 2B configuring the edge position specified electromagnet pair 2(T). When discriminating that the pseudo edge position Se' of the steel plate S is present further on the width direction end 2Xe side of the electromagnet pair region 2X than the predetermined value 2a (the pseudo edge position Se' of the steel plate S is present in a range larger than the predetermined value 2a with the reference set in the width direction center 2c of the electromagnets 2A and 2B), the control unit 4 outputs, to the electromagnets 2A and 2B, current amount control information ("current amount control information" is equivalent to "current amount control signal" of the present invention) for switching the electromagnets 2A and 2B configuring the edge position specified electromagnet pair 2(T) to the excited state. On the other hand, when discriminating that the pseudo edge position Se' of the steel plate S is absent further on the width direction end 2Xe side of the electromagnet pair region 2X than the predetermined value 2a (the pseudo edge position Se' of the steel plate S is equal to or smaller than the predetermined value 2a with the reference set in the width direction center 2c of the electromagnets 2A and 2B), the control unit 4 outputs, to the electromagnets 2A and 2B, current amount control information for switching the electromagnets 2A and 2B configuring the edge position specified electromagnet pair 2(T) to the unexcited state. The current amount control means 43 outputs, to the respective electromagnets 2A and 2B, current amount control information for switching the respective electromagnets 2A and 2B configuring the plurality of electromagnet pair 2 arranged between the electromagnet pair 2, in which one pseudo edge position Se' of the steel plate S is specified as being present between the electromagnets 2A and 2B, and the electromagnet pair 2, in which the other pseudo edge position Se' of the steel plate S is specified as being present between the electromagnets 2A and 2B, to the excited state. According to the procedure explained above, it is possible to perform On/Off control for the respective electromagnets 2A and 2B without requiring a special sensor for detecting an edge position of the steel plate S.

Further, in the electromagnetic vibration suppression device 1 according to the first embodiment, concerning the steel plate S passing the molten zinc tank Z and running between the first electromagnet 2A and the second electromagnet 2B in the excited state on the basis of the current amount control information while being pulled up, the first sensor 3A and the second sensor 3B associated with the electromagnets 2A and 2B respectively detect distances to the steel plate S, i.e., positions in the thickness direction of the steel plate S (vibration information of the steel plate S) on a real time basis and output respective detection information (the vibration information of the steel plate S) to the control unit 4. The control unit 4 outputs, on the basis of the detection information (the vibration information of the steel plate S), to the electromagnets 2A and 2B, current amount control information concerning the magnitude of amounts of electric currents fed to the respective first electromagnet 2A and the second electromagnet 2B in the excited state. In this way, in the first embodiment, only the position information in the thickness direction of the steel plate S, i.e., the vibration information of the steel plate S is detected by the sensors 3A and 3B. The control unit 4 is configured to control, on the basis of the vibration information, the magnitude of amounts of electric currents fed to the respective electromagnets 2A and 2B. Amounts of electric currents fed to the first electromagnet 2A and the second electromagnet 2B is controlled on the basis of current amount information concerning the magnitude of the current amount output from the control unit 4. As a result, the steel plate S is guided by the magnetic attraction force of the respective electromagnets 2A and 2B to approach the intermediate position between the first electromagnet 2A and the second electromagnet 2B.

Therefore, it is possible to maintain, within a fixed range, the distance between the steel plate S passing the molten zinc tank Z and running while being pulled up and the jetting ports in the respective nozzles A1 configuring the air knife unit A. It is possible to prevent fluctuation in jetting force acting on the steel plate S and obtain uniform or substantially uniform plating thickness.

In this way, in the electromagnetic vibration suppression device 1 according to the first embodiment, the control unit 4 is used which includes the pseudo displacement amount calculation means 41 for setting, as the switched sensor reference position 3p, the position of the sensor 3 on the innermost side among the sensor 3 switched from the ON state to the OFF state or the position of the sensor 3 on the outermost side among the sensors 3 switched from the OFF state to the ON state among the sensors 3 attached to the electromagnet pairs 2 and calculating the pseudo displacement amount α' of the steel plate S on the basis of the switched sensor reference position 3p, the pseudo edge position calculation means 42 for calculating the pseudo edge position Se' of the steel plate S on the basis of the pseudo displacement amount α' of the steel plate S calculated by the pseudo displacement amount calculation means 41, and the current amount control means 43 for individually controlling amounts of electric currents fed to the electromagnets 2A and 2B on the basis of the pseudo edge position Se' of the steel plate S calculated by the pseudo edge position calculation means 42. The pseudo displacement amount α' calculated by the pseudo displacement amount calculation means 41 could be different from the actual displacement amount α of the steel plate S. However, an error between the pseudo displacement amount α' and the actual displacement amount α is at most in a degree of a separation dimension between the electromagnet pairs 2 adjacent to each other in the width direction of the electromagnet pair region 2X and is specifically in a degree of the distance between detection points of the sensors 3 respectively attached to the adjacent electromagnet pairs 2. The error is an error which is hardly a problem in actual operation. Therefore, it is possible to calculate the pseudo displacement amount α', which is an error in an allowable range, in actual operation using the sensors 3 configured to detect position information in the thickness direction of the steel plate S (vibration information of the steel plate S). In the electromagnetic vibration suppression device 1 according to the first embodiment configured to calculate the pseudo edge position Se' of the steel plate S using the pseudo displacement amount α', it is unnecessary to arrange a sensor for detecting an edge position of the steel plate S separately from the sensors 3 configured to detect position information in the thickness direction of the steel plate S (vibration information of the steel plate S). It is possible to appropriately and surely control, on the basis of the edge position information of the steel plate S calculated by the pseudo edge position calculation means 42, whether the respective electromagnets 2A and 2B are switched to the excited state and effectively suppress the vibration of the steel plate S running with the normal posture and the steel plate S running while meandering in the width direction. The electromagnetic vibration suppression device 1 is excellent in practical use. Therefore, when the electromagnetic vibration suppression device 1 is disposed in the continuous galvanized steel plate line L together with the air knife unit A configured to blow off excess molten metal adhering to the steel plate S, it is possible to effectively suppress, with the electromagnetic vibration suppression device 1, vibration during running with the normal posture. As a result, it is possible to maintain the distance between the steel plate S and the air knife unit A within a fixed range, prevent fluctuation in jetting force acting on the steel plate S, and obtain uniform or substantially uniform plating thickness.

The electromagnetic vibration suppression program according to the first embodiment includes the pseudo displacement amount calculating step S1 of calculating the pseudo displacement amount α' using position information of the sensors 3 attached to the electromagnet pairs 2, the pseudo edge position calculating step S2 of calculating the pseudo edge position Se' of the steel plate S on the basis of the pseudo displacement amount α' calculated in the pseudo displacement amount calculating step S1, and the current amount controlling step S3 of individually controlling amounts of electric currents fed to the electromagnets 2A and 2B on the basis of the pseudo edge position Se' of the steel plate S calculated in the pseudo edge position calculating step S2. Therefore, as explained above, it is possible to appropriately suppress the vibration of the steel plate S running with the normal posture and the steel plate S running while meandering in the width direction.

Note that the present invention is not limited to the first embodiment explained above. For example, when both of the sensors switched from the ON state to the OFF state and the sensors switched from the OFF state to the ON state are present, the pseudo displacement amount calculating means can be configured to set, as switched sensor reference positions, both of the position of the sensor on the inner most side among the sensors switched from the ON state to the OFF state and the position of the sensor on the outermost side among the sensors switched from the OFF state to the ON state, and calculate pseudo displacement amounts of the respective sensor positions, and calculate, as a pseudo displacement amount, a value (an average value) obtained by adding up values of the pseudo displacement amounts and dividing the added-up value by two or can be configured to calculate a pseudo displacement amount preferentially using one of the switched sensor reference positions.

The relative positions of the sensors to the respective electromagnet pairs may be changed as appropriate. It is possible to match the detection points of the sensors with the width direction center portion of the electromagnet pairs or set the detection points in positions displaced to the width direction end side from the width direction center portion of the electromagnet pairs.

The current amount control means may control a current amount of the electromagnets by adjusting output intensity (the magnitude of amounts of electric currents fed to the electromagnets) in addition to ON/OF of a current output (whether the electromagnets are switched to the excited state or the unexcited state) or instead of ON/OF of the output current. In particular, when the current amount control means is not configured to control switching of ON/OFF of the current output but is configured to adjust output intensity without turning off the current output (switching the electromagnets to the unexcited state), instead of the OFF state of the current output (the unexcited state of the electromagnets) in the first embodiment explained above, it is desirable to feed a feeble electric current for not moving the steel plate between the electromagnet pairs in the width direction with the magnetic attraction force of the electromagnets or, even when moving the steel plate, moving the steel plate only by a very small distance which can be ignored. If such current control is performed, compared with the aspect for performing the ON/OFF control of the current output, since the feeble current is always output even in a state in which the steel plate is not moved in the width direction, responsiveness in increasing the current output to move the steel plate in the width direction by a desired distance is improved. It is possible to improve vibration suppression control efficiency for the steel plate.

The output source configured to output the width dimension of the steel plate to the control unit may be a device different from the electromagnetic vibration suppression device or a part of the electromagnetic vibration suppression device.

The number of electromagnet pairs and a pitch between electromagnet pairs adjacent to each other in the width direction can be changed as appropriate. The pith of the electromagnet pairs adjacent to each other in the width direction may be set uneven. In this case, a pitch of sensors attached to the electromagnet pairs could be uneven as well. However, a maximum error between an actual displacement amount (meandering amount) and a pseudo displacement amount of the steel plate is the distance between sensors having the largest pitch (specifically, a separation distance between detection points having the largest pitch). The width dimension of the electromagnet pair region may be changed as appropriate according to a change in the number of electromagnet pairs or the pitch between the electromagnet pairs.

In the aspect illustrated in the first embodiment, among all the electromagnet pairs, the electromagnet pair 2 arranged in the width direction center portion 2Xc of the electromagnet pair region 2X (the electromagnet pair 2 affixed with "iv" in FIG. 5) is not attached with the sensor 3. However, an aspect may be adopted in which the electromagnet pairs 2 "iii" and "v" adjacent to the electromagnet pair 2 "iv" are set as electromagnet pairs arranged near the width direction center portion 2Xc of the electromagnet pair region 2X and the electromagnet pairs 2 are not attached with the sensors 3. Further, when an even number of electromagnet pairs are arranged in the width direction of the electromagnet pair region, at least two electromagnet pairs near the width direction center portion of the electromagnet pair region do not have to be attached with sensors.

In the first embodiment explained above, the molten zinc tank is illustrated as the molten metal tank. However, instead of the molten zinc tank, for example, a tank in which molten tin or aluminum, resin paint, or the like is stored may be applied. In the electromagnetic vibration suppression device of the present invention, as surface coat treatment for the steel plate, besides plating coat treatment, other surface coat treatment such as surface coloring treatment for applying surface coat treatment by spraying an appropriate surface treatment material on the steel plate can be adopted.

Further, the electromagnetic vibration suppression device of the present invention may be a device which suppresses vibration of a steel plate adapted to pass between electromagnets while being pulled down after being subjected to the surface coat treatment or a device which suppresses and controls vibration of a steel plate adapted to pass between electromagnets while horizontally moving after being subjected to the surface coat treatment. In the first embodiment explained above, the posture of the steel plate passing between the electromagnets is vertical. However, in the present invention, the steel plate can be adapted to pass between the electromagnets with a posture other than vertical, for example, one of horizontal posture and inclined posture.

The second embodiment of the present invention is explained with reference to the drawings. Note that reference numerals and signs in the explanation (including the drawings) of the second embodiment are unrelated to the reference numerals and signs in the first embodiment.

Figure 9:
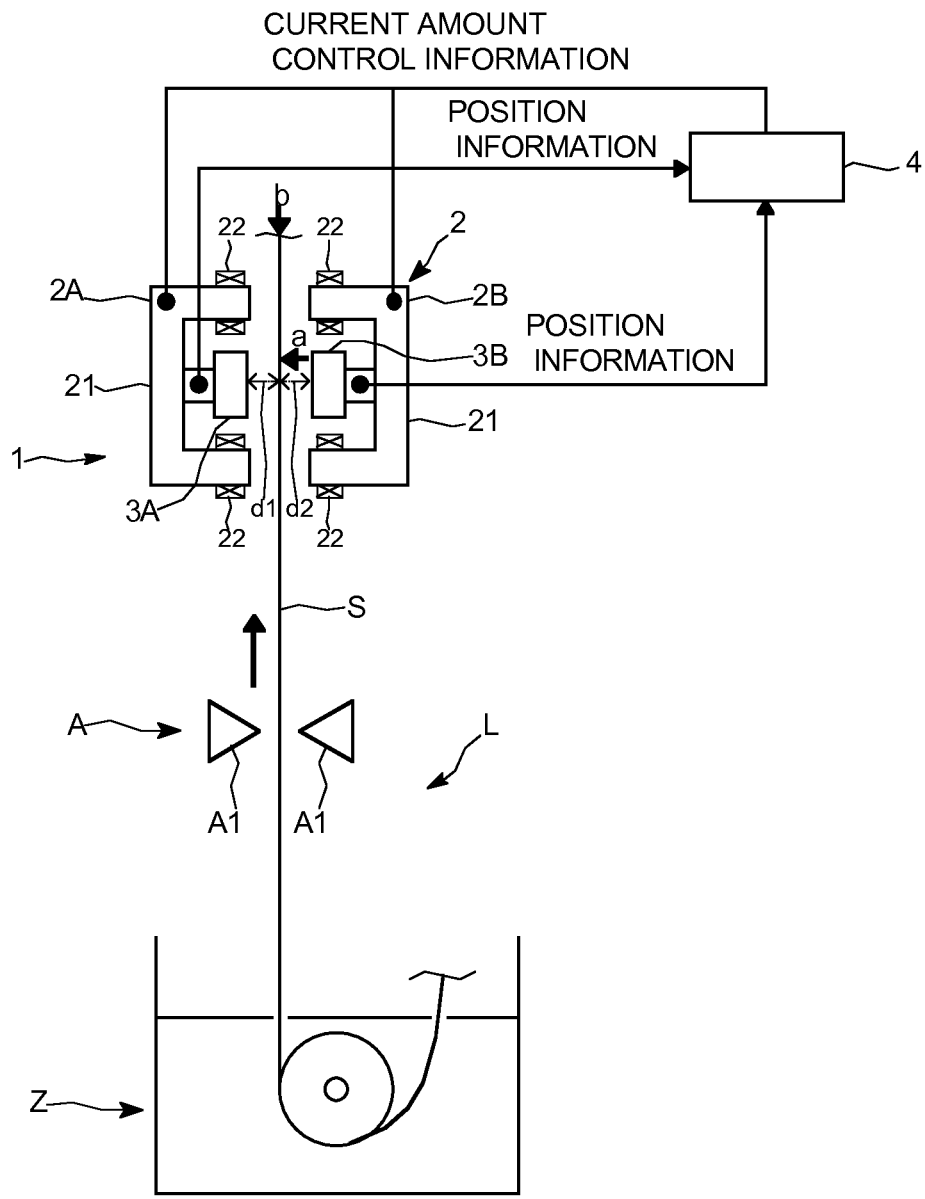
FIG. 9 is an overall configuration schematic diagram of an electromagnetic vibration suppression device according to a second embodiment of the present invention.

As shown in FIG. 9, an electromagnetic vibration suppression device 1 according to the second embodiment is disposed further on a downstream side than a molten metal tank (in the second embodiment, the molten zinc tank Z is applied) in a continuous galvanized steel plate line L. The electromagnetic vibration suppression device 1 suppresses the vibration of a steel plate S which passes the molten zinc tank Z and runs while being pulled up. Note that, in FIG. 9, a state in which the steel plate S is viewed from a side surface is schematically shown and, in FIG. 10, an "a" direction arrow view of FIG. 9 is schematically shown. FIG. 11 is a diagram schematically showing a state in which the running steel plate S is viewed from above (a "b" direction in FIG. 9). Note that, in FIG. 9, the steel plate S is represented by one solid line for convenience. However, as shown in FIG. 11, the electromagnetic vibration suppression device 1 according to the second embodiment can display vibration suppression act for the steel plate S running in a predetermined direction in a shape curved in the thickness direction. In particular, as shown in FIG. 11, the electromagnetic vibration suppression device 1 according to the second embodiment can display stable vibration suppression act for the steel plate S curved in a partially arc shape (a partially elliptical arc shape).

In the continuous galvanized steel plate line L (in particular, a galvanized steel plate line in which molten zinc is used is referred to as "Continuous Galvanizing Line" (CGL)), an air knife unit A including nozzles A1, jetting ports of which are directed to the steel plate S, is provided between the molten zinc tank Z and the electromagnetic vibration suppression device 1. Excess molten zinc is blown off by jetting pressurized air or pressurized gas from the jetting ports of the respective nozzles A1 to the steel plate S which passes the molten zinc tank Z and runs while being pulled up. As the molten zinc tank Z and the air knife unit A, known ones can be applied. Detailed explanation thereof is omitted.

Figure 10:
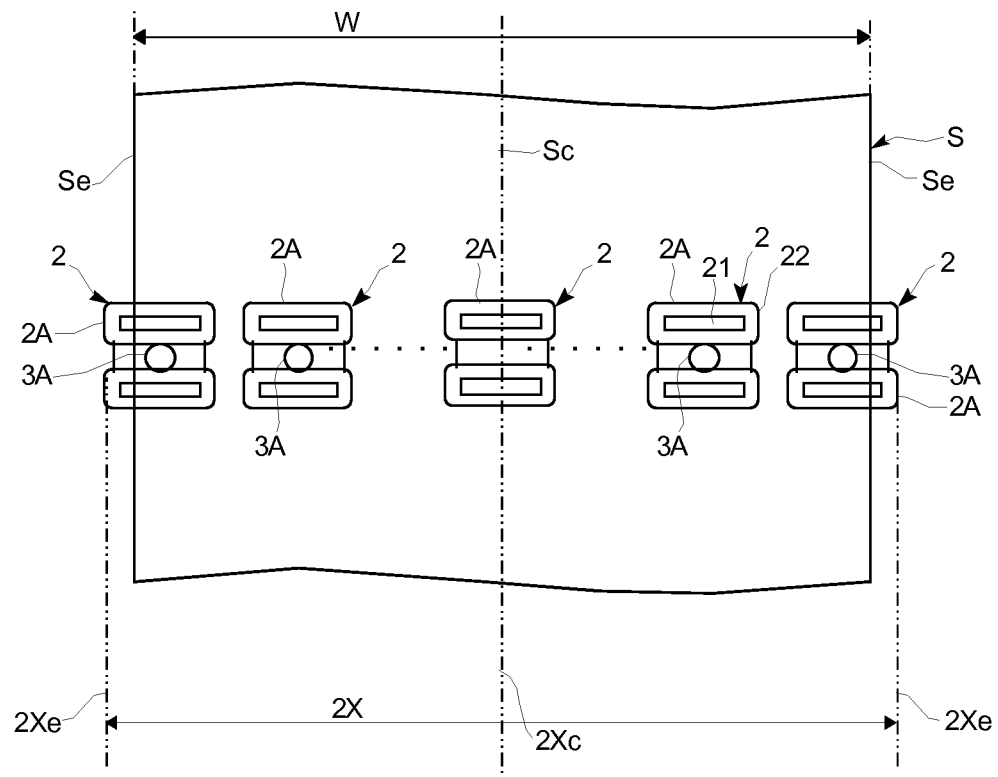
FIG. 10 is an "a" direction schematic arrow view of FIG. 9.
Figure 11:
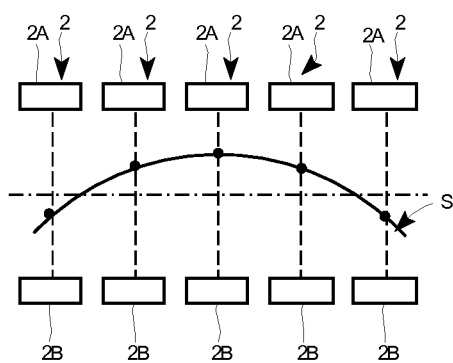
FIG. 11 is a "b" direction schematic arrow view of FIG. 9.

In the electromagnetic vibration suppression device 1, as shown in FIGS. 10 and 11, a plurality of electromagnet pairs 2 (in FIG. 10, five or more electromagnet pairs 2 and, in FIG. 11, five electromagnet pairs 2 for convenience of explanation), which are sets of first electromagnets 2A and second electromagnets 2B arranged to be opposed to each other in a position where the electromagnets can hold the steel plate S in the thickness direction, are arranged in the width direction of the steel plate S at a predetermined pitch. Note that, in FIG. 10, actually, a near side steel plate S is indicated by a broken line. Each of the first electromagnets 2A and the second electromagnets 2B configuring the respective electromagnet pairs 2 is configured by an iron core 21 formed in a C shape or a substantial C shape in cross section and coils 22 wound around respective legs of the iron core 21 and is a known electromagnet which can be switched, according to whether electric power is fed to the coils 22, between an excited state in which magnetic attraction force can be output from the iron core 21 and an unexcited state in which magnetic attraction force is not output from the iron core 21. In the second embodiment, the plurality of electromagnet pairs 2 are disposed in the width direction of the steel plate S at the predetermined pitch. When the steel plate S runs in an electromagnet pair region 2X with a normal posture (hereinafter referred to as "normal posture") without meandering, as shown in FIG. 10, a with direction center Sc of the steel plate S coincides with a width direction center 2Xc of the region (the electromagnet pair region) 2X in which the plurality of electromagnet pairs 2 are disposed. When odd number sets equal to or larger than three sets of the electromagnet pairs 2 are disposed in the electromagnet pair region 2X, a width direction center of the electromagnet pair 2 disposed in the center and the width direction center 2Xc of the electromagnet pair region 2X are matched. Note that, in FIG. 11, the width direction centers in the respective electromagnet pairs 2 are indicated by broken lines and the middle of the first electromagnets 2A and the second electromagnets 2B is indicated by an alternate long and short dash line.

Figure 19:
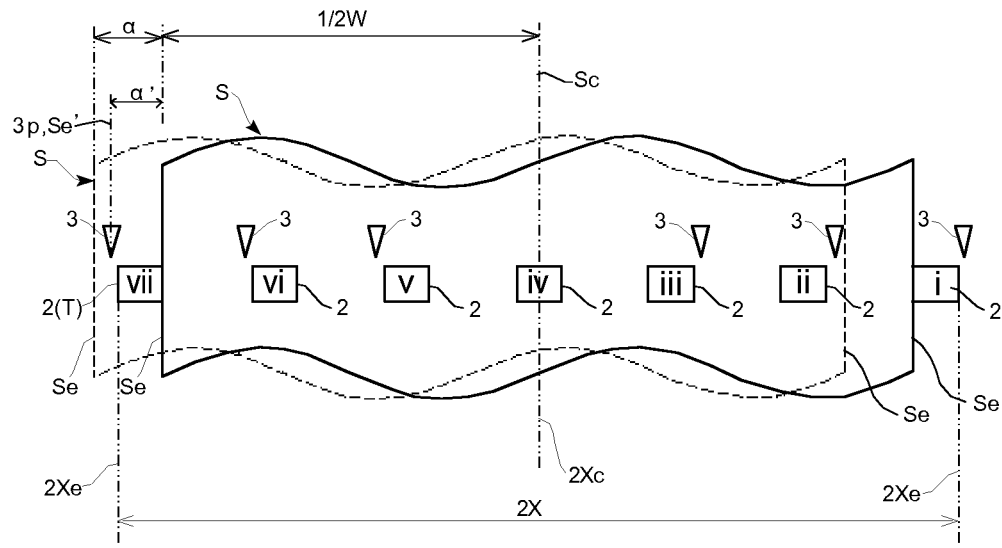
FIG. 19 is a conceptual diagram in calculating a pseudo displacement amount in the embodiment.

In the electromagnetic vibration suppression device 1, first sensors 3A and second sensors 3B configured to detect a distance to the steel plate S are provided on surfaces of the respective first electromagnets 2A and the respective electromagnets 2B opposed to the steel plate S. In the second embodiment, for example, sensors 3A and 3B of an eddy current type are applied. The first sensors 3A and the second sensors 3B are arranged in concave portions (positions which can be held by the legs of the iron core 21) of the respective electromagnets 2A and 2B. Detection surfaces of the first sensors 3A, and the second sensors 3B are set on surfaces same as or substantially same as magnetic pole surfaces of the respective electromagnets 2A and 2B respectively corresponding thereto and are provided in positions opposed to each other across the steel plate S. The first sensors 3A and the second sensors 3B detect distances d1 and d2 to the steel plate S and output detection results of the sensors to a control unit 4 as detection signals. Note that, in the second embodiment, the sensors 3A and 3B are set to be capable of detecting a distance to the steel plate S only in a state in which the entire detection surfaces of the sensors 3A and 3B are completely or substantially completely covered by the steel plate S. One pair of the sensors 3A and 3B are associated with the respective electromagnet pairs 2. In the following explanation, one pair of the sensors 3A and 3B provided to be associated with one electromagnet pair 2 are sometimes generally simply referred to as "sensor 3". As shown in FIG. 10, a layout in which the center (a detection point) of the sensor 3 is matched or substantially matched with a width direction center 2c of the electromagnet pair 2 can be adopted. As shown in FIG. 19, a layout in which the center (the detection point) of the sensor 3 is matched or substantially matched with end portions of the respective electromagnet pairs 2, more specifically, an end portion relatively distant from the width direction center portion 2Xc of the electromagnet pair region 2X in the electromagnet pair 2 can be adopted. As shown in FIGS. 10 and 19, the sensor 3 is not provided in the electromagnet pair 2 (the electromagnet pair 2 affixed with "iv" in FIG. 19) arranged in the width direction center portion 2Xc of the electromagnet pair region 2X among all the electromagnet pairs 2. This is because it is difficult to assume that the steel plate S meanders to a degree in which an edge position of the steel plate S passes the electromagnet pair 2 arranged in the width direction center portion 2Xc of the electromagnet pair region 2X. Note that the sensor 3 may be also provided in the electromagnet pair 2 arranged in the width direction center portion 2Xc of the electromagnet pair region 2X. The sensor 3 may be configured to determine that an abnormal situation occurs and forcibly stop the electromagnetic vibration suppression device 1 at a point when the sensor 3 is switched from an ON state in which the presence of the steel plate S is detected between the electromagnets 2A and 2B of the electromagnet pair 2 to an OFF state in which the presence of the steel plate S is not detected between the electromagnets 2A and 2B of the electromagnet pair 2. In FIGS. 10 and 19 to 22, the steel plate S in a regular state is indicated by a broken line.

The electromagnetic vibration suppression device 1 according to the second embodiment includes the control unit 4 electrically connected to the electromagnets 2A and 2B of the respective electromagnet pairs 2 and configured to control magnetic attraction force of the respective electromagnets 2A and 2B based on amounts of electric currents fed to the respective electromagnets 2A and 2B. The electromagnetic vibration suppression device 1 is configured to be capable of suppressing, with the control unit 4, the vibration of the steel plate S running between the electromagnets 2A and 2B of the respective electromagnet pairs 2 in an expected curved shape in an opposing direction of the first electromagnet 2A and the second electromagnet 2B. In the second embodiment, as the expected curved shape of the steel plate S, a partial arc shape (a partial elliptical arc shape) symmetrical with respect to the width direction center of the steel plate S is adopted. Target positions (expected target positions: in FIG. 11, position indicated by painted-out black circles) of the steel plate S in the respective electromagnet pairs 2 are input to the control unit 4 such that the steel plate S is curved in the expected curved shape. When the steel plate S does not meander, electric currents fed to the respective electromagnets 2A and 2B is controlled by the control unit 4 such that relative positions of the steel plate S in the respective electromagnet pairs 2 are the expected target positions.

The electromagnetic vibration suppression device 1 according to the second embodiment is the same as a well-known electromagnetic vibration suppression device in that the control unit 4 is also electrically connected to the respective sensors 3A and 3B and the control unit 4 controls the magnetic attraction force of the respective electromagnets 2A and 2B to suppress the vibration of the steel plate S on the basis of position information of the steel plate S detected by the respective sensors 3A and 3B. However, the electromagnetic vibration suppression device 1 according to the second embodiment is different from the well-known electromagnetic vibration suppression device as explained below.

Figure 12:
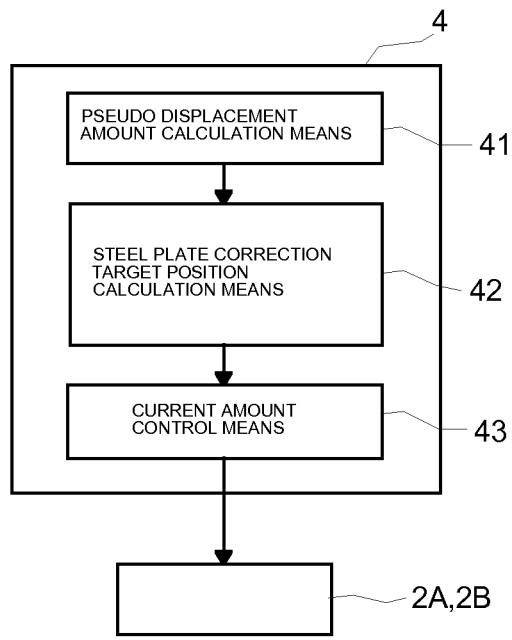
FIG. 12 is a functional block diagram of a control unit in the electromagnetic vibration suppression device according to the embodiment.

As shown in FIG. 12, the control unit 4 in the electromagnetic vibration suppression device 1 according to the second embodiment includes pseudo displacement amount calculation means 41 for calculating when the steel plate S is displaced in the width direction, a pseudo change amount $\alpha'$, which is a pseudo displacement amount (a meandering amount), in the width direction of the steel plate S using the position of the sensor 3 switched between the ON state and the OFF state during the transfer of the steel plate S at least on a real time basis or at every predetermined time, steel plate correction target position calculation means 42 for calculating, on the basis of the calculated pseudo displacement amount $\alpha'$ (a pseudo meandering amount), correction target positions of the steel plate S in the respective electromagnet pairs 2 such that the steel plate S is curved in the expected curved shape, and current amount control means 43 for individually controlling amounts of electric currents fed to the electromagnets 2A and 2B configuring the respective electromagnet pairs 2 to move the meandering steel plate S to the correction target positions of the steel plate S calculated by the steel plate correction target position calculation means 42. Note that information concerning the line L side, i.e., plate thickness, plate width, steel type, tension, and the like, which are information concerning the running steel plate S, is input to the control unit 4 from a host computer (not shown in the figure) electrically connected to the electromagnetic vibration suppression device 1.

The pseudo displacement amount calculation means 41 calculates, as the pseudo displacement amount $\alpha'$ of the steel plate S, a difference between the distance from the steel plate center position Sc, which is a width direction center position of the steel plate S in a regular state in which the steel plate S does not meander in the width direction, to a "switched sensor reference position $3p$", which is at least one of the position of a sensor (a sensor on the innermost side) closest to the width direction center portion 2Xc of the electromagnet pair region 2X among the sensors 3 switched from the ON state to the OFF state and the position of a sensor (a sensor on the outermost side) most distant from the width direction center portion 2Xc of the electromagnet pair region 2X among the sensors 3 switched from the OFF state to the ON state and a half length of a width dimension of the steel plate S. The pseudo displacement amount calculation means 42 can be grasped as means for calculating the pseudo displacement amount $\alpha'$ of the steel plate S with a primary calculating unit configured to calculate a distance (provisional meandering width) from the steel plate center position Sc to the switched sensor reference position $3p$ and a secondary calculating unit configured to calculate a difference between the provisional meandering width calculated by the primary calculating unit and the half length of the width dimension of the steel plate S.

Figure 13:
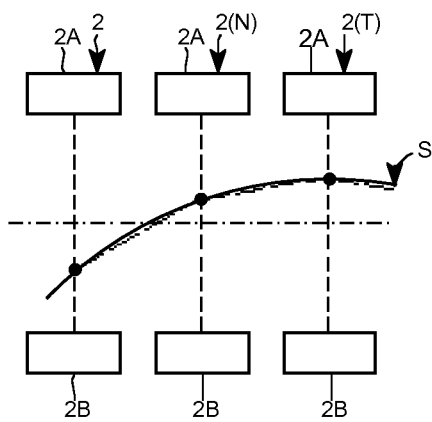
FIG. 13 is a partially enlarged view of FIG. 11.
Figure 14:
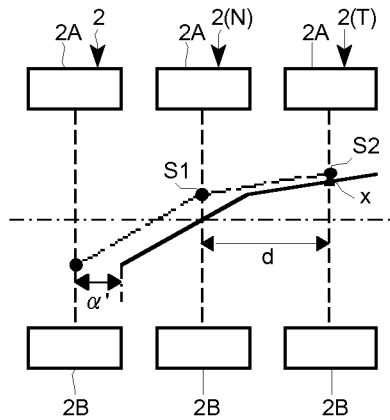
FIG. 14 is a diagram showing a state in which a curved shape of a steel plate shown in FIG. 11 is approximated by a straight line.

The steel plate correction target position calculation means 42 calculates correction target positions of the steel plate S in the respective electromagnet pairs 2 for each of the electromagnet pairs 2 using, in addition to the pseudo displacement amount $\alpha'$ of the steel plate S explained above, an expected target position (expected target position information), which is a target position of the steel plate S, set in advance or on a real time basis for each of the electromagnet pairs 2 such that the steel plate S is curved in the expected curved shape in a state in which the steel plate S does not meander and the distance between the electromagnet pairs 2 adjacent to each other (more specifically, the distance between the width direction centers of the respective electromagnet pairs 2, hereinafter referred to as "inter-electromagnet pair distance (inter-electromagnet pair distance information)"). As shown in FIGS. 13 and 14, which are partially enlarged views of FIG. 11, the electromagnetic vibration suppression device 1 according to the second embodiment approximate, as a polygonal line shape connecting expected target positions of the steel plate S in the electromagnet pairs 2 adjacent to one another with a straight line (a polygonal line connecting the expected target positions of the steel plate S in order with line segments: indicated by broken lines in FIGS. 13 and 14), a curved shape of the steel plate S running in the electromagnet pair region 2X with the normal posture without displacing in the width direction, i.e., an expected curved shape which is a curved shape of the steel plate S before meandering. The electromagnetic vibration suppression device 1 calculates, with the steel plate correction target position calculation means 42, correction target positions of the steel plate S in the respective electromagnet pairs 2 using the respective expected target positions of the steel plate S in the electromagnet pairs 2 adjacent to one another, a meandering amount of the steel plate S, and the inter-electromagnet pair distance on the basis of a technical idea that, even when the steel plate S meanders, as indicated by a solid line in FIG. 14, the steel plate S has a shape same or substantially same as the expected curved shape in a meandering position if the approximated shape of the steel plate S is translated in the width direction of the electromagnet pair region 2X and retained.

In this way, the steel plate correction target position calculation means 42 straight-line interpolates (linearly interpolates) the expected target position of the steel plate S for each of the electromagnet pairs 2 among the electromagnet pairs 2 adjacent to one another and derives a correction target position of the meandering steel plate S through arithmetic operation using the inter-electromagnet distance and the pseudo displacement amount $\alpha'$ of the steel plate S. Note that the distance between the electromagnet pairs 2 adjacent to each other is set in advance and input to the control unit 4 as "inter-electromagnet distance information". The control unit 4 can set, as appropriate, timing for calculating the pseudo displacement amount $\alpha'$ in the pseudo displacement amount calculation means 41 and timing for calculating the correction target position in the steel plate correction target position calculation means 42 to real time, every predetermined time, or the like.

Figure 15:
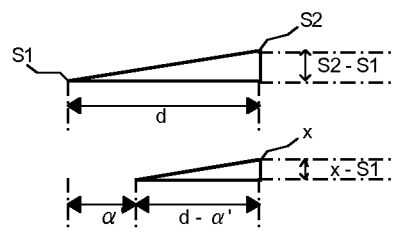
FIG. 15 is a diagram showing a right triangle having, as one side, a straight line approximated to a curved shape of the steel plate between adjacent electromagnets before and after meandering.

As shown in FIGS. 14 and 15 (FIG. 15 is a part of FIG. 14, two right triangles in a similarity relation explained below are individually shown), an expected target position of the steel plate S in an electromagnet pair 2(T) for which a correction target position "x" of the steel plate S after being displaced (meandering) in the width direction (hereinafter referred to as "correction target position calculation target electromagnet pair 2(T)") is represented as "S2" and an expected target position of the steel plate S in an electromagnet pair 2(T) adjacent to the correction target position calculation target electromagnet pair 2(T) is represented as "S1". The electromagnetic vibration suppression device 1 according to the second embodiment performs arithmetic processing explained below in the steel plate correction target position calculation means 42 of the control unit 4 making use of the fact that a right triangle (a right triangle on the upper side on the paper surface of FIG. 15) formed by a line segment which can be indicated as a difference "S2−S1" of coordinates in a y-axis direction (a direction in which the first electromagnet 2A and the second electromagnet 2B are opposed to each other) at the time when the respective expected target positions S1 and S2 are calculated as coordinates on a common xy plane, a line segment which can be indicated as an inter-electromagnet pair distance "d", which is a separation distance between the electromagnet pairs 2(T) and 2(N) adjacent to each other in an x-axis direction, and a line segment connecting the expected target positions S2 and S1 of the steel plate S in the respective electromagnets 2(T) and 2(N) is in a similarity relation with a right triangle (a right triangle on the lower side on the paper surface of FIG. 15) formed by a line segment which can be indicated as a difference "x−S1" in the y-axis direction at the time when the correction target position "x" of the steel plate S in the correction target position calculation target electromagnet pair 2(T) and the expected target position "S1" of the steel plate S in the electromagnet pair 2(N) are calculated as coordinates on the common xy plane, a line segment in the x-axis direction which can be indicated as a difference "d−α'" between the inter-electromagnet pair distance "d" and the pseudo displacement amount "α'" of the steel plate S, and a line segment extending in parallel to a straight line connecting the expected target positions S2 and S1 of the steel plate S from the correction target position "x" of the steel plate S.

Specifically, the steel plate correction target position calculation means 42 according to the second embodiment calculates the correction target position "x" of the steel plate S in the correction target position calculation target electromagnet pair 2(T) making use of the fact that a first relative ratio "(S2−S1):(x−S1)", which is a ratio of the difference "S2−S1" of the coordinates in the y-axis direction (the direction in which the first electromagnet 2A and the second electromagnet 2B are opposed to each other) at the time when the respective expected target positions S1 and S2 are calculated as coordinates on the common xy plane and the difference "x−S1" in the y-axis direction at the time when the correction target position "x" of the steel plate S and the expected target position "S1" of the steel plate S in the electromagnet pair 2(N) are calculated as coordinates on the common xy plane, is equal to a second relative ratio "d:(d−α')", which is a ratio of the inter-electromagnet pair distance "d" and a difference "d−α'" between the inter-electromagnet pair distance "d" and the pseudo displace amount (the meandering amount) "α'" of the steel plate S. That is, the steel plate correction target position calculation means 42 calculates the correction target position "x" of the steel plate S in the correction target position calculation target electromagnet pair 2(T) from a numerical expression connecting the first relative ratio "(S2−S1):(x−S1)" and the second relative ratio "d:(d−α')" with an equation, i.e., "(S2−S1):(x−S1)=d:(d−α')". When the numerical expression "(S2−S1):(x−S1)=d:(d−α')" is expanded to a numerical expression for calculating "x", "x= ((S2−S1) (d−α')/d)+S1" is obtained. It is possible to calculate the correction target position "x" of the steel plate S in the correction target position calculation target electromagnet pair 2(T) by substituting numerical values based on the expected target position information of the steel plate S, the inter-electromagnet pair distance information, and the pseudo displacement amount information of the steel plate S in the adjacent electromagnet pairs 2 input to the control unit 4 respectively in "S2", "S1", "d", and "α'". In the second embodiment, the steel plate correction target position calculation means 42 calculates the correction target positions "x" of the steel plate S in the respective electromagnet pair 2 respectively as numerical values according to such arithmetic processing.

The current amount control means 43 temporarily replaces the target positions of the steel plate S in the respective electromagnet pairs 2 from the expected target positions to the correction target position "x" calculated by the steel plate correction target position calculation means 42 and switches the electromagnets 2A and 2B configuring the respective electromagnet pairs 2 to the excited state or the unexcited state such that the positions of the steel plate S in the respective electromagnet pairs 2 move from the expected target positions to the correction target positions. Note that, when it is discriminated on the basis of the pseudo displacement amount information that the steel plate S is absent between the first electromagnet 2A and the second electromagnet 2B in the electromagnet pair 2, the electromagnets 2A and 2B configuring the electromagnet pair 2 and the respective sensors 3A and 3B do not have to be driven.

Note that, although not shown in the figure, the control unit 4 includes a controller to which output signals from the respective sensors 3A and 3B are input, a sequencer configured to output, for example, a command concerning a control gain to the controller, and a first amplifier and a second amplifier configured to respectively supply electric currents to the respective electromagnets 2A and 2B on the basis of a command (current amount control information) output by the controller concerning electric currents fed to the respective electromagnets 2A and 2B. However, detailed explanation of the controller, the sequencer, and the respective amplifiers is omitted.

Next, a using method and action of the electromagnetic vibration suppression device 1 having such a configuration is explained.

First, when the electromagnetic vibration suppression device 1 is started, the expected target position information and the inter-electromagnet distance information of the steel plate S in the respective electromagnet pairs 2 are input to the control unit 4. The control unit 4 controls current amounts of the respective electromagnets 2A and 2B on the basis of the expected target position information of the steel plate S in the respective electromagnet pairs 2. Consequently, as shown in FIGS. 9 and 11, it is possible to suppress the vibration of the steel plate S, which passes the molten zinc tank Z and runs without meandering while being pulled up, while retaining the steel plate S in the expected curved shape.

Figure 16:
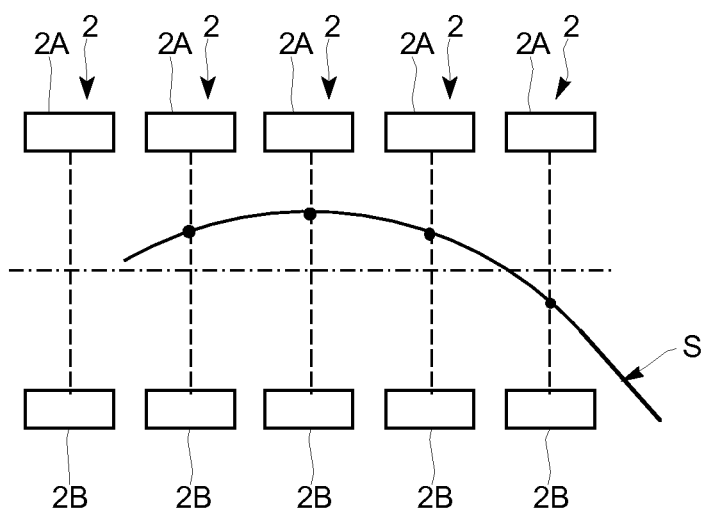
FIG. 16 is a diagram showing, in association with FIG. 11, the shape of the steel plate subjected to vibration suppression control on the basis of an expected target position after meandering.

Incidentally, even when the running steel plate S meanders, when the control unit 4 continues to control the current amounts of the respective electromagnets 2A and 2B on the basis of the expected target position information of the steel plate S in the respective electromagnet pairs, i.e., when the control unit 4 continues to maintain the target positions of the steel plate S in the respective electromagnet pairs 2 in the expected target position, as shown in FIG. 16, the steel plate S is deformed into a shape different from the expected curved shape. Therefore, it is likely that appropriate vibration suppression action for the steel plate S cannot be displayed.

Figure 20:
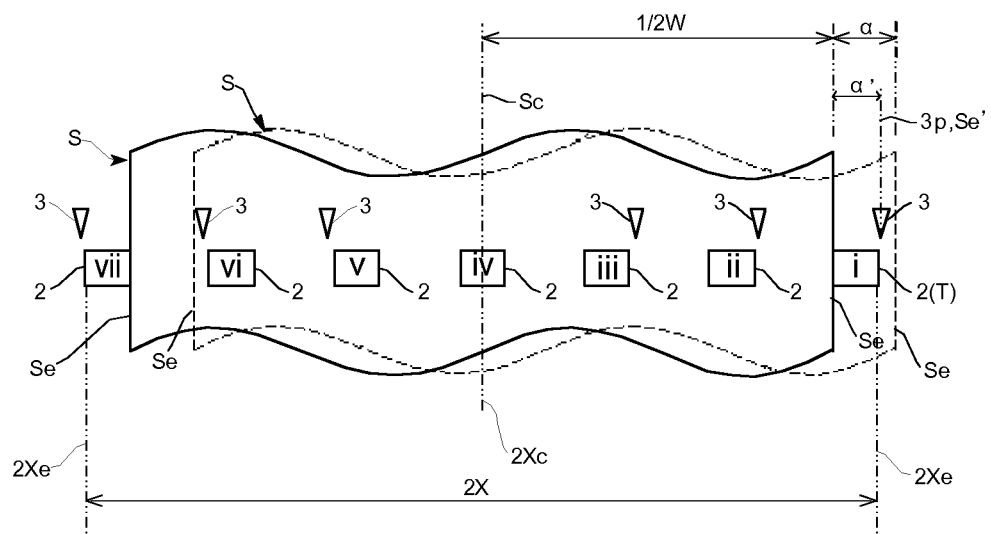
FIG. 20 is a conceptual diagram in calculating a pseudo displacement amount in the embodiment.

Therefore, the electromagnetic vibration suppression device 1 according to the second embodiment executes an electromagnetic vibration suppression program according to the second embodiment to cause the units to operate as explained below on a real time basis or at every predetermined time. That is, the electromagnetic vibration suppression device 1 calculates, with the pseudo displacement amount calculation means 41 of the control unit 4, the pseudo displacement amount α' of the running steel plate S (a pseudo displacement amount calculating step S1: see FIG. 17). Specifically, as shown in FIGS. 19 and 20, when the steel plate S having a width dimension, with which the sensors 3 attached to the electromagnet pairs 2 (electromagnet pairs "i" and "vii" shown in FIGS. 19 and 20) at the width direction both ends 2Xe of the electromagnet pair region 2X is switched to the OFF state in the regular state, meanders to one end side (in FIG. 19, the left side on the paper surface and, in FIG. 20, the right side on the paper surface) in the width direction of the electromagnet pair region 2X and only the sensor 3 attached to the electromagnet pair 2 arranged on the one end side 2Xe (in FIG. 19, the sensor 3 attached to the electromagnet pair "vii" at the left end and, in FIG. 20, the sensor 3 attached to the electromagnet pair "i" at the right end) is switched from the OFF state to the ON state, the pseudo displacement amount calculating means 41 calculates the pseudo displacement amount α' according to a procedure explained below. The pseudo displacement amount calculating means 41 sets, as the switched sensor reference position 3p, the position of the sensor 3 (the sensor 3 on the outermost side) most distant from the width direction center portion 2Xc of the electromagnet pair region 2X among the sensors 3 switched from the OFF state to the ON state, calculates the distance from the switched sensor reference position 3*p* to the steel plate center position Sc, calculates a difference between the distance and a half length of the width dimension of the steel plate S, and sets a calculated value as the pseudo displacement amount α'. As shown in FIGS. 19 and 20, when there is no sensor 3 switched from the ON state to the OFF state according to meandering of the steel plate S, it is possible to calculate the pseudo displacement amount α' taking notice of only the sensor switched from the OFF state to the ON state (the sensor 3 attached to the electromagnet pair vii or the sensor 3 attached to the electromagnet pair i). A formula for calculating the pseudo displacement amount α' in such a case, i.e., taking notice of only the sensor 3 switched from the OFF state to the ON state when the steel plate S meanders is "(the distance from the steel plate center position Sc to the switched sensor reference position 3*p*)—a half of the width dimension of the steel plate S".

Figure 21:
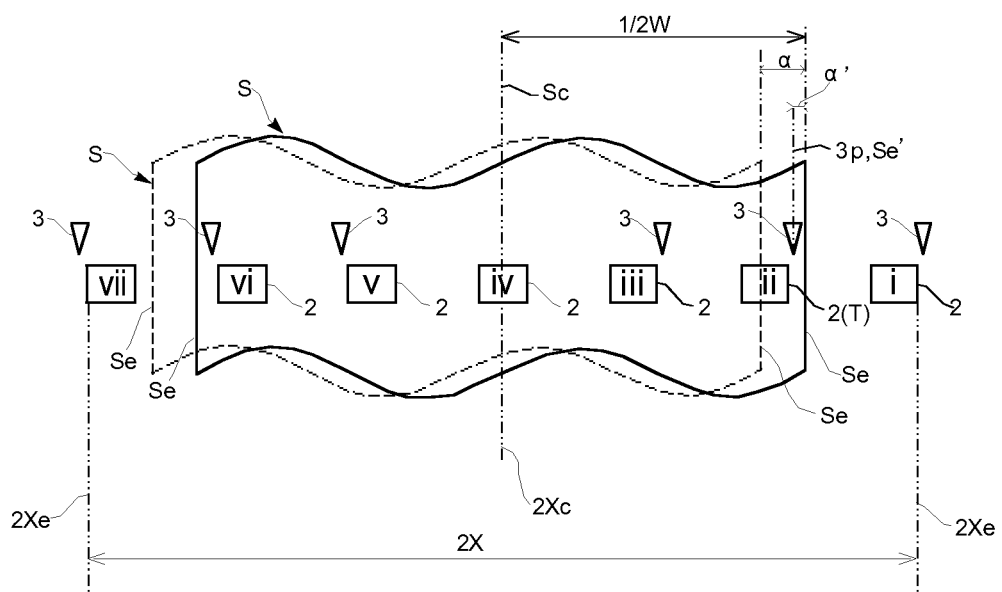
FIG. 21 is a conceptual diagram in calculating a pseudo displacement amount in the embodiment.
Figure 22:
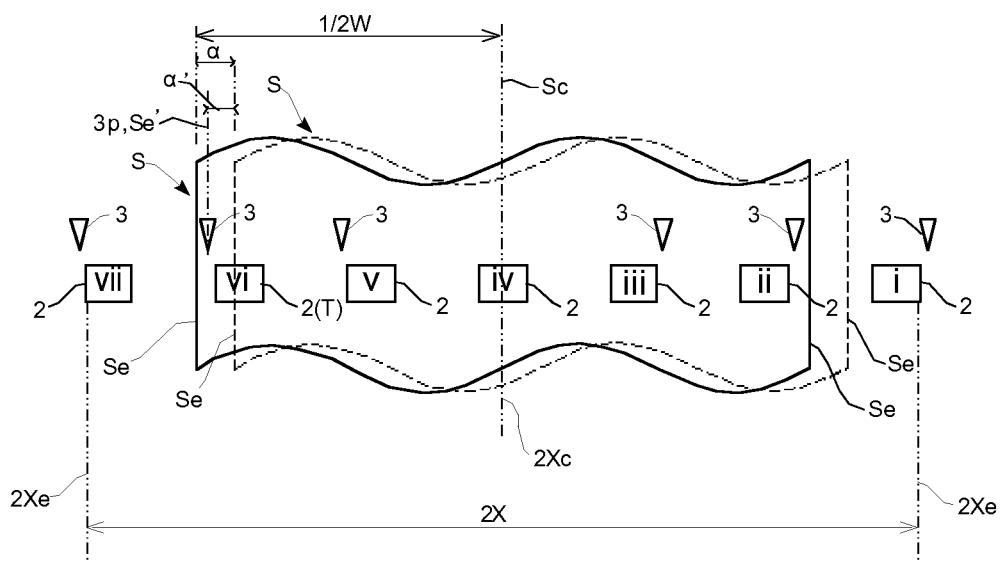
FIG. 22 is a conceptual diagram in calculating a pseudo displacement amount in the embodiment.

As shown in FIGS. 21 and 22, when the steel plate S having a width dimension, with which the sensors 3 attached to the electromagnet pairs 2 (electromagnet pairs "i" and "vii" shown in FIGS. 21 and 22) at the width direction both ends 2Xe of the electromagnet pair region 2X is switched to the OFF state in the regular state, smaller than the width dimension of the steel plate S shown in FIGS. 19 and 20 meanders to any one end 2Xe side in the electromagnet pair arrangement region 2X (in FIG. 21, the left side on the paper surface and, in FIG. 22, the right side on the paper surface) and the sensor 3 attached to the electromagnet pair 2 arranged on the other end side (in FIG. 21, the sensor 3 attached to the second electromagnet pair "vi" from the right and, in FIG. 22, the sensor 3 attached to the second electromagnet pair "ii" from the left) is switched from the ON state to the OFF state, the pseudo displacement amount calculating means 41 calculates the pseudo displacement amount α' according to a procedure explained below. That is, the pseudo displacement amount calculating means 41 sets, as the switched sensor reference position 3*p*, the position of the sensor 3 (the sensor 3 on the innermost side) closest to the width direction center portion 2Xc of the electromagnet pair region 2X among the sensors 3 switched from the ON state to the OFF state, calculates the distance from the switched sensor reference position 3*p* to the steel plate center position Sc, calculates a difference between the distance and a half length of the width dimension of the steel plate S, and sets a calculated value as the pseudo displacement amount α'. As shown in FIGS. 21 and 22, when there is no sensor 3 switched from the OFF state to the ON state according to meandering of the steel plate S, it is possible to calculate the pseudo displacement amount α' taking notice of only the sensor 3 switched from the ON state to the OFF state (in FIG. 21, the sensor 3 attached to the second electromagnet pair "vi" from the right and, in FIG. 22, the sensor 3 attached to the second electromagnet pair "ii" from the left). A formula for calculating the pseudo displacement amount α' in such a case, i.e., taking notice of only the sensor 3 switched from the ON state to the OFF state when the steel plate S meanders is "a half of the width dimension of the steel plate S—(the distance from the steel plate center position Sc to the switched sensor reference position 3*p*)". Note that, in FIGS. 19 to 22, the steel plate S in the regular state is indicated by a solid line and the meandering steel plate S is indicated by a broken line.

Figure 17:
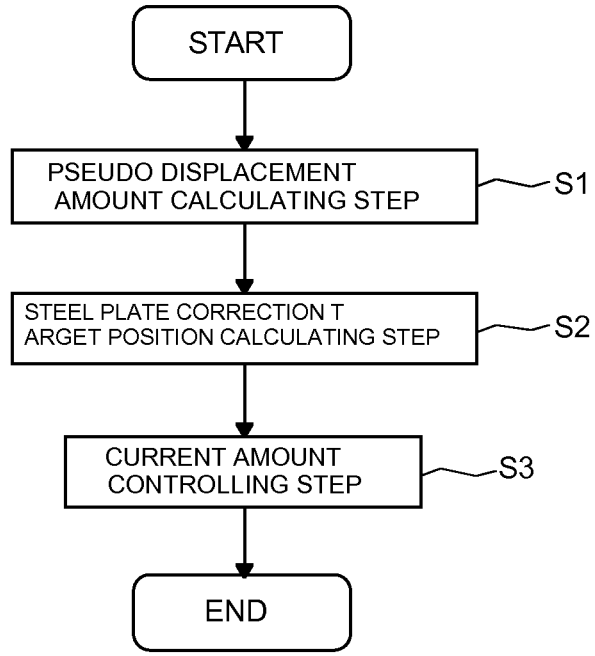
FIG. 17 is a flowchart of an electromagnetic vibration suppression program used for the electromagnetic vibration suppression device according to the second embodiment.

Subsequently, in the electromagnetic vibration suppression device 1 according to the second embodiment, when determining on the basis of the pseudo displacement amount α' calculated by the pseudo displacement amount calculation means 41 that the steel plate S meanders, the control unit 4 calculates, with the correction target position calculation means 42, correction target positions x of the steel plate S in the respective electromagnet pairs 2 on the basis of the meandering amount information of the steel plate S, expected target position information of the steel plate S in the respective electromagnet pairs 2, and the inter-electromagnet distance information (a steel plate correction target position calculation step S2; see FIG. 17). Specifically, the correction target position calculation means 42 substitutes numerical values based on the expected target position information of the steel plate S, the inter-electromagnet distance information, and the meandering amount information of the steel plate S input to the control unit 4 respectively in "S2", "S1", "d", and "α'" using the numerical expression "x=((S2−S1)(d−α')/d)+S1" and calculates the correction target positions "x" of the steel plate S in the respective electromagnet pairs 2(T).

Figure 18:
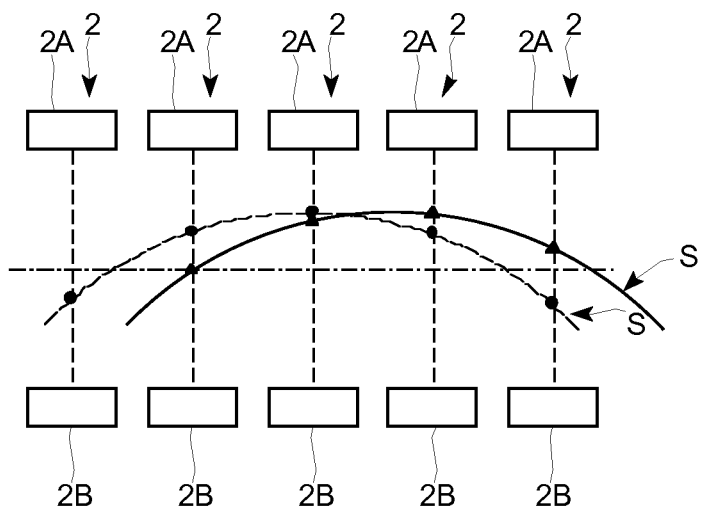
FIG. 18 is a diagram showing, in association with FIG. 11, the shape of the steel plate subjected to vibration suppression control on the basis of a correction target position after meandering.

Subsequently, on the basis of the correction target positions "x" calculated by the steel plate correction target position calculating step S2 by the correction target position calculation means 42 instead of the expected target positions as control data for setting target positions of the steel plate S in the respective electromagnet pairs 2, the control unit 4 individually controls, with the current amount control means 43, amounts of electric currents fed to the electromagnets 2A and 2B such that the positions of the steel plate S running while meandering with respect to the respective electromagnet pairs 2 respectively move to the correction target positions (a current amount controlling step S3; see FIG. 17). Note that the electromagnetic vibration suppression device 1 according to the second embodiment outputs, from the control unit 4 to the respective electromagnets 2A and 2B, current amount information for individually switching the first electromagnets 2A and the second electromagnets 2B configuring the respective electromagnet pairs 2 to the excited state or the unexcited state. As a result, the electromagnetic vibration suppression device 1 in the second embodiment can keep the steel plate S in the expected curved shape in a meandering position as indicated by a solid line in FIG. 18 and display appropriate vibration suppression action for the steel plate S running in the expected curved shape. Note that, in FIG. 18, the steel plate S running with the normal posture without meandering in the expected curved shape is indicated by a broken line.

In this way, when the steel plate S running in the curved shape meander, the electromagnetic vibration suppression device 1 according to the second embodiment can perform vibration suppression control while keeping the steel plate S in the expected curved shape in the meandering position.

Note that, in the electromagnetic vibration suppression device 1 according to the second embodiment, information concerning in which positions in the respective electromagnet pairs 2 the steel plate S passing the molten zinc tank Z and running while being pulled up is present can be detected by the first sensor 3A and the second sensor 3B. Detection information (position information) from the sensors 3A and 3B are input to the control unit 4 on a real time basis or at every predetermined time. The control unit 4 outputs, on the basis of the detection information (the position information) and the correction target position information, current amount control information for switching the first electromagnet 2A and the second electromagnet 2B to the excited state or current amount control information for switching the first electromagnet 2A and the second electromagnet 2B to the unexcited state to the respective electromagnets 2A and 2B and controls electric currents fed to the respective electromagnets 2A and 2B. As a result, not only when the steel plate S runs without meandering but also when the steel plate S meanders, the steel plate S is kept in a curved shape same as or substantially same as the expected curved shape with magnetic attraction force of the respective electromagnets 2A and 2B. Vibration during running is suppressed.

Therefore, it is possible to maintain distances between the steel plate S having such a curved shape and the jetting ports in the respective nozzles A1 configuring the air knife unit A within a fixed range assumed in advance while maintaining the rigidity of the steel plate S by curving, in the width direction, the steel plate S passing the molten zinc tank Z and running while being pulled up. It is possible to prevent fluctuation in jetting force acting on the steel plate S and obtain uniform or substantially uniform plating thickness.

In this way, in the electromagnetic vibration suppression device 1 according to the second embodiment, the control unit 4 is used which includes the pseudo displacement amount calculation means 41 for setting, as the switched sensor reference position 3p, the position of the sensor 3 on the innermost side among the sensor 3 switched from the ON state to the OFF state or the position of the sensor 3 on the outermost side among the sensors 3 switched from the OFF state to the ON state among the sensors 3 attached to the electromagnet pairs 2 and calculating the pseudo displacement amount α' of the steel plate S on the basis of the switched sensor reference position 3p, the steel plate correction target position calculation means 42 for calculating the correction target positions x of the steel plate S in the respective electromagnet pairs 2 on the basis of the pseudo displacement amount α' of the steel plate S calculated by the pseudo displacement amount calculation means 41, and the current amount control means 43 for individually controlling amounts of electric currents fed to the electromagnets 2A and 2B to move the meandering steel plate S to the correction target positions x of the steel plate S calculated by the steel plate correction target position calculation means 42. The pseudo displacement amount α' calculated by the pseudo displacement amount calculation means 41 could be different from the actual displacement amount α of the steel plate S. However, an error between the pseudo displacement amount α' and the actual displacement amount α is at most in a degree of a separation dimension between the electromagnet pairs 2 adjacent to each other in the width direction of the electromagnet pair region 2X and is specifically in a degree of the distance between detection points of the sensors 3 respectively attached to the adjacent electromagnet pairs 2. The error is an error which is hardly a problem in actual operation. Therefore, it is possible to calculate the pseudo displacement amount α', which is an error in an allowable range, in actual operation using the sensors 3 configured to detect position information in the thickness direction of the steel plate S (vibration information of the steel plate S). In the electromagnetic vibration suppression device 1 according to the second embodiment configured to calculate the target correction positions x of the steel plate S using the pseudo displacement amount α', it is unnecessary to arrange a sensor for detecting an edge position of the steel plate S separately from the sensors 3 configured to detect position information in the thickness direction of the steel plate S (vibration information of the steel plate S) and a meandering amount detection device capable of directly detecting a meandering amount of the steel plate S. It is possible to appropriately and surely control, on the basis of the target correction position information of the steel plate S calculated by the steel plate correction target position calculation means 42, whether the respective electromagnets 2A and 2B are switched to the excited state. Even when the steel plate S running in the curved shape meanders, it is possible to guide the steel plate S to be a shape same as or substantially same as the expected curved shape in a meandering position. It is possible to appropriately suppress vibration during running for the steel plate S meandering in the width direction. As a result, it is possible to effectively suppress the vibration not only of the steel plate S running with the normal posture while keeping the expected curved shape but also of the steel plate S running while meandering in the width direction. The electromagnetic vibration suppression device 1 is excellent in practical use. Therefore, when such electromagnetic vibration suppression device 1 is disposed in the continuous galvanized steel plate line L together with the air knife unit A configured to blow off excess molten metal adhering to the steel plate S, it is possible to effectively suppress, with the electromagnetic vibration suppression device 1, the vibration of the steel plate S running while keeping the expected curved shape or in a curved shape coinciding with or substantially coinciding with the expected curved shape. As a result, it is possible to maintain the distance between the steel plate S and the air knife unit A within an assumed fixed range, prevent fluctuation in jetting force acting on the steel plate S, and obtain uniform or substantially uniform plating thickness.

The electromagnetic vibration suppression program according to the second embodiment includes the pseudo displacement amount calculating step S1 of calculating the pseudo displacement amount α' using position information of the sensors 3 attached to the electromagnet pairs 2, the steel plate correction target position calculating step S2 of calculating, on the basis of the pseudo displacement amount α' calculated in the pseudo displacement amount calculating step S1, the correction target positions x of the steel plate S of the respective electromagnet pairs 2 such that the steel plate S is curved in the expected curved shape, and the current amount controlling step S3 of individually controlling amounts of electric currents fed to the electromagnets 2A and 2B to move the meandering steel plate S to the correction target positions x of the steel plate S calculated in the steel plate correction target position calculating step S2. Therefore, as explained above, it is possible to appropriately suppress the vibration of the steel plate S running with the normal posture without meandering and the steel plate S running while meandering in the width direction.

Note that the present invention is not limited to the second embodiment explained above. For example, when both of the sensors switched from the ON state to the OFF state and the sensors switched from the OFF state to the ON state are present, the pseudo displacement amount calculating means can be configured to set, as switched sensor reference positions, both of the position of the sensor on the inner most side among the sensors switched from the ON state to the OFF state and the position of the sensor on the outermost side among the sensors switched from the OFF state to the ON state, and calculate pseudo displacement amounts of the respective sensor positions, and calculate, as a pseudo displacement amount, a value (an average value) obtained by adding up values of the pseudo displacement amounts and dividing the added-up value by two or can be configured to calculate a pseudo displacement amount preferentially using one of the switched sensor reference positions.

The relative positions of the sensors to the respective electromagnet pairs may be changed as appropriate. It is possible to match the detection points of the sensors with the width direction center portion of the electromagnet pairs or set the detection points in positions displaced to the width direction end side from the width direction center portion of the electromagnet pairs.

As the expected curved shape of the steel plate, instead of the partial arc (the partial elliptical arc) described in the second embodiment explained above, a shape obtained by combining a plurality of partial arcs (a wavy shape or an S shape) and a curved shape asymmetrical with respect to the width direction center can be adopted.

The output source configured to output the expected target position of the steel plate and the inter-electromagnet distance to the control unit may be a device different from the electromagnetic vibration suppression device or a part of the electromagnetic vibration suppression device.

The current amount control means may control current amounts of the electromagnets by performing adjustment of output intensity (the magnitude of electric currents fed to the electromagnets) in addition to ON/OFF of a current output or instead of ON/OFF of the current output. In particular, when the current amount control means is not configured to control switching of ON/OFF of the current output but is configured to adjust output intensity without turning off the current output (switching the electromagnets to the unexcited state), instead of the OFF state of the current output (the unexcited state of the electromagnets) in the second embodiment explained above, it is desirable to feed a feeble electric current for not moving the steel plate between the electromagnet pairs in the width direction with the magnetic attraction force of the electromagnets or, even when moving the steel plate, moving the steel plate only by a very small distance which can be ignored. If such current control is performed, compared with the aspect for performing the ON/OFF control of the current output, since the feeble current is always output even in a state in which the steel plate is not moved in the width direction, responsiveness in increasing the current output to move the steel plate in the width direction by a desired distance is improved. It is possible to improve vibration suppression control efficiency for the steel plate. Current amounts of the respective electromagnets may be controlled by adjusting output intensity.

The output source configured to output the width dimension of the steel plate to the control unit may be a device different from the electromagnetic vibration suppression device or a part of the electromagnetic vibration suppression device.

The number of electromagnet pairs arranged in the width direction of the steel plate and a pitch between electromagnet pairs adjacent to each other in the width direction of the steel plate (a numerical value serving as the basis of inter-electromagnet distance information) can be changed as appropriate. The pitch between the electromagnet pairs adjacent to each other in the width direction may be set uneven. In this case, a pitch between sensors attached to the electromagnet pairs could be uneven as well. However, a maximum error between an actual displacement amount (meandering amount) and a pseudo displacement amount of the steel plate is the distance between sensors having the largest pitch (specifically, a separation distance between detection points having the largest pitch). The width dimension of the electromagnet pair region may be changed as appropriate according to a change in the number of electromagnet pairs or the pitch between the electromagnet pairs.

In the aspect illustrated in the second embodiment explained above, among all the electromagnet pairs, the electromagnet pair 2 arranged in the width direction center portion 2Xc of the electromagnet pair region 2X (the electromagnet pair 2 affixed with "iv" in FIG. 19) is not attached with the sensor 3. However, an aspect may be adopted in which the electromagnet pairs 2 "iii" and "v" adjacent to the electromagnet pair 2 "iv" are set as electromagnet pairs arranged near the width direction center portion 2Xc of the electromagnet pair region 2X and the electromagnet pairs 2 are not attached with the sensors 3. Further, when an even number of electromagnet pairs are arranged in the width direction of the electromagnet pair region, at least two electromagnet pairs near the width direction center portion of the electromagnet pair region do not have to be attached with sensors.

In the second embodiment explained above, the molten zinc tank is illustrated as the molten metal tank. However, instead of the molten zinc tank, for example, a tank in which molten tin or aluminum, resin paint, or the like is stored may be applied. In the electromagnetic vibration suppression device of the present invention, as surface coat treatment for the steel plate, besides plating coat treatment, other surface coat treatment such as surface coloring treatment for applying surface coat treatment by spraying an appropriate surface treatment material on the steel plate can be adopted. The electromagnetic vibration suppression device of the present invention can also suitably suppress the vibration of the steel plate running at a point before the application of the surface coat treatment and the vibration of the steel plate running in a predetermined direction without being subjected to the surface coat treatment.

Further, the electromagnetic vibration suppression device of the present invention may be a device which suppresses vibration of a steel plate adapted to pass between electromagnets while being pulled down after being subjected to the surface coat treatment or a device which suppresses and controls vibration of a steel plate adapted to pass between electromagnets while horizontally moving after being subjected to the surface coat treatment. In the second embodiment explained above, the posture of the steel plate passing between the electromagnets is vertical. However, in the present invention, the steel plate can be adapted to pass between the electromagnets with a posture other than vertical, for example, one of horizontal posture and inclined posture.

Besides, specific configurations of the respective units are not limited to the respective embodiments described above. Various modifications are possible without departing from the spirit of the present invention.

INDUSTRIAL APPLICABILITY

The present invention can be used as an electromagnetic vibration suppression device capable of appropriately suppressing the vibration of a steel plate running with a normal posture, effectively suppressing the vibration of a steel plate running while meandering, and effectively suppressing the vibration of a steel plate running while meandering while keeping a curved shape even in usage environments where information concerning a meandering amount is not provided from a host computer or the like and without adopting a special edge position detection sensor and a meandering amount detection device as an essential structure.

The invention claimed is:

1. An electromagnetic vibration suppression device for suppressing vibration of a running steel plate, comprising:
   a plurality of electromagnet pairs arranged in a width direction of the steel plate, each electromagnet pair including
   a combination of electromagnet oppositely arranged to each other in a thickness direction of the steel plate running in predetermined direction; and
   a control unit configured to control electric currents fed to the respective electromagnets, the control unit suppressing vibration of the steel plate running between the electromagnets of the respective electromagnet pairs, wherein a plurality of sensor pairs, each sensor pair detecting presence of the steel plate between the electromagnet pair, and each sensor arranged on each of electromagnets to face the steel plate excluding the electromagnet arranged in the width direction center position or near, and each sensor pair arranged to an opposing location interpose the steel plate between two sensors in pair, and the control unit includes pseudo displacement amount calculation means, pseudo edge position calculation means, and current amount control means, the pseudo displacement calculation means calculating a pseudo displacement amount $\alpha'$ of the steel plate, wherein the value $\alpha'$ is calculated as a difference between a provisional meandering width and a value of ½ W, in which W is a width dimension of the steel plate, wherein the provisional meandering width is a distance from a steel plate center position, which is a width direction center position of the steel plate in a regular state in which the steel plate does not meander in the width direction, to a switched sensor reference position based on at least one of a position of a sensor closest to the width direction center portion of the electromagnet pair region among sensors switched from an ON state in which presence of the steel plate is detected between the electromagnets of the electromagnet pairs to an OFF state in which the presence of the steel plate is not detected between the electromagnets of the electromagnet pairs and a position of a sensor most distant from the width direction center portion of the electromagnet pair region among sensors switched from the OFF state to the ON state, the pseudo edge position calculation means calculating a pseudo edge position of the steel plate by using a formula of ½ W±$\alpha'$, wherein the pseudo edge position is an approximative position of an actual edge position of the steel plate, and the current amount control means individually controlling amounts of electric currents fed to the electromagnets on the basis of the pseudo edge position of the steel plate calculated by the pseudo edge position calculation means, among said plurality of electromagnet pairs, the current amount control means detects an edge-position detecting electromagnet pair in which the pseudo edge position is disposed therebetween, the pseudo edge position obtained by the formula above in the pseudo edge position calculation means, and then, a driving condition is made on the electromagnets making up the electromagnet pairs located at a side closer to a widthwise center than the edge-position detecting electromagnet pair, while a non-driving condition is made on other electromagnets located at a side closer to the widthwise end than the edge-position detecting electromagnet pair.

2. The electromagnetic vibration suppression device according to claim 1, wherein the current amount control means outputs a current control signal for switching the respective electromagnets to an excited state or an unexcited state.

3. The electromagnetic vibration suppression device according to claim 2, wherein the current amount control means outputs a current control signal for switching, among the respective electromagnets, the electromagnet present further on a width direction center side of the steel plate than the pseudo edge position of the steel plate calculated by the pseudo edge position calculation means to the excited state and switching the other electromagnets to the unexcited state.

4. The electromagnetic vibration suppression device according to claim 3, wherein the current control means specifies the electromagnet pair in which the pseudo edge position of the steel plate calculated by the pseudo edge position calculation means is present between the electromagnets and, in the specified electromagnet pair, when it is discriminated that the pseudo edge position is present further on a width direction end side of the electromagnet pair region where the plurality of electromagnet pairs are arranged than a predetermined value, which is set with a center in a width direction center of the electromagnets configuring the electromagnet pairs, switching the electromagnets configuring the specified electromagnet pair to the excited state and, when it is discriminated that the pseudo edge position is present further on the width direction center side of the electromagnet pair region than the predetermined value, switching the electromagnets configuring the specified electromagnet pair to the unexcited state.

5. A non-transitory computer readable medium storing computer program to be applied to the electromagnetic vibration suppression device according to claim 1, the program comprising:

a pseudo displacement amount calculating step, a pseudo edge position calculating step, and a current amount control step, wherein the pseudo displacement amount calculating step calculating, a pseudo displacement amount $\alpha'$ of a steel plate, wherein the value $\alpha'$ is calculated as a difference between a provisional meandering width and a value of ½ W, in which W is a width dimension of the steel plate, wherein the provisional meandering width is a distance from a steel plate center position, which is a width direction center position of the steel plate in a regular state in which the steel plate does not meander in the width direction, to a switched sensor reference position based on at least one of a position of a sensor closest to a width direction center portion of an electromagnet pair region among sensors switched from an ON state to an OFF state and a position of a sensor most distant from the width direction center portion of the electromagnet pair region among sensors switched from the OFF state to the ON state, the pseudo edge position calculating step calculating a pseudo edge position of the steel plate by using a formula of ½ W±$\alpha'$, wherein the pseudo edge position is an approximative position of an actual edge position of the steel plate, and the current amount controlling step of individually controlling amounts of electric currents fed to the electromagnets on the basis of the pseudo edge position of the steel plate calculated in the pseudo edge position calculating step, among said plurality of electromagnet pairs, the current amount control means detects an edge-position detecting electromagnet pair in which the pseudo edge position is disposed therebetween, the pseudo edge position obtained by the formula above in the pseudo edge position calculation means, and then, a driving condition is made on the electromagnets making up the electromagnet pairs located at a side closer to a widthwise center than the edge-position detecting electromagnet pair, while a non-driving condition is made on other electromagnets located at a side closer to the widthwise end than the edge-position detecting electromagnet pair.

6. An electromagnetic vibration suppression device for suppressing vibration of a running steel plate, comprising:

a plurality of electromagnet pairs arranged in a width direction of the steel plate, each electromagnet pair including a combination of electromagnet oppositely arranged to each other in a thickness direction of the steel plate running in predetermined direction; and a control unit configured to control electric currents fed to the respective electromagnets, the control unit suppressing vibration of the steel plate running between the electromagnets of the respective electromagnet pairs in a shape curved in an opposing direction of the electromagnets, wherein a plurality of sensor pairs, each sensor pair detecting presence of the steel plate between the electromagnet pair, and each sensor arranged on each of electromagnets to face the steel plate excluding the electromagnet arranged in the width direction center position or near, and each sensor pair arranged to an opposing location interpose the steel plate between two sensors in pair, and the control unit includes pseudo displacement amount calculation means, steel plate correction target position calculation means, and current amount control means, the pseudo displacement calculation means calculating a pseudo displacement amount $\alpha'$ of the steel plate, wherein the value $\alpha'$ is calculated as a difference between a provisional meandering width and a value of ½ W, in which W is a width dimension of the steel plate, wherein the provisional meandering width is a distance from a steel plate center position, which is a width direction center position of the steel plate in a regular state in which the steel plate does not meander in the width direction, to a switched sensor reference position based on at least one of a position of a sensor closest to the width direction center portion of the electromagnet pair region among sensors switched from an ON state in which presence of the steel plate is detected between the electromagnets of the electromagnet pairs to an OFF state in which the presence of the steel plate is not detected between the electromagnets of the electromagnet pairs and a position of a sensor most distant from the width direction center portion of the electromagnet pair region among sensors switched from the OFF state to the ON state, the steel plate correction target position calculation means for corrected position of steel plate is adapted to calculate a corrected target position of the steel plate between the electromagnets making up each electromagnet pair[s] such that the steel plate takes an expected curved shape at a preset, based on a pseudo displacement amount $\alpha'$ in the width direction of the steel sheet, the pseudo displacement amount $\alpha'$ being inputted in real time or at every predetermined time, and the current amount control means individually controlling amounts of electric currents fed to the electromagnets configuring the respective electromagnet pairs to move the steel plate displaced in the width direction to correction target positions of the steel plate in the respective electromagnet pairs calculated by the steel plate correction target position calculation means, the steel sheet running while keeping a curved shape.

7. The electromagnetic vibration suppression device according to claim 6, wherein
an expected curved shape of the steel plate at a point before being displaced in the width direction is approximated by a straight line connecting expected target positions of the steel plate in the respective electromagnet pairs adjacent to one another, and the steel plate correction target position calculation means calculates, for each of the electromagnet pairs, a correction target position of the steel plate using respective expected target positions of the steel plate in a target electromagnet pair, for which a correction target position of the steel plate is calculated, and an electromagnet pair adjacent to the electromagnet pair, the pseudo displacement amount, and the distance between the electromagnet pairs adjacent to each other.

8. The electromagnetic vibration suppression device according to claim 6, wherein the steel plate target position calculation means calculates, respectively as coordinates, an expected target position of the steel plate in an electromagnet pair for which a correction target position of the steel plate is calculated and an expected target position of the steel plate in an electromagnet pair adjacent to the electromagnet pair, calculates a difference between the coordinates, calculates a difference between a correction target position of the steel plate in the electromagnet pair for which the correction target position is calculated and an expected target position of the steel plate in the electromagnet pair adjacent to the electromagnet pair, and calculates respective correction target positions of the steel plate in the respective electromagnet pairs making use of a fact that a first relative ratio, which is a ratio of the differences, which are results of the two calculations, is equal to a second relative ratio, which is a ratio of a separation distance between the electromagnet pairs adjacent to each other and a value obtained by subtracting the pseudo displacement amount of the steel plate from the separation distance.

9. A non-transitory computer readable medium storing computer program to be applied to the electromagnetic vibration suppression device according to claim 6, the program comprising;

a pseudo displacement amount calculating step, a steel plate correction target position calculating step, and a current amount control step, wherein the pseudo displacement amount calculating step calculating, as a pseudo displacement amount $\alpha'$ of a steel plate, wherein the value $\alpha'$ is calculated as a difference between a provisional meandering width and a value of ½ W, in which W is a width dimension of the steel plate, wherein the provisional meandering width is a distance from a steel plate center position, which is a width direction center position of the steel plate in a regular state in which the steel plate does not meander in a width direction, to a switched sensor reference position based on at least one of a position of a sensor closest to a width direction center portion of an electromagnet pair region among sensors switched from an ON state in which presence of the steel plate is detected between electromagnets of an electromagnet pair to an OFF state in which the presence of the steel plate is not detected between the electromagnets of the electromagnet pair and a position of a sensor most distant from the width direction center portion of the electromagnet pair region among sensors switched from the OFF state to the ON state, the steel plate correction target position calculating step for corrected position of steel plate, is adapted to calculate a corrected target position of the steel plate between the electromagnets making up each electromagnet pair[s] such that the steel plate takes an expected curved shape at a preset, based on a pseudo displacement amount $\alpha'$ in the width direction of the steel sheet, the pseudo displacement amount $\alpha'$ being inputted in real time or at every predetermined time, and the current amount controlling step individually controlling amounts of electric currents fed to the electromagnets configuring the respective electromagnet pairs to move the steel plate displaced in the width direction to correction target positions of the steel plate in the respective electromagnet pairs calculated in the steel plate correction target position calculating step, the steel sheet running while keeping a curved shape.

* * * * *